United States Patent
Sato et al.

(10) Patent No.: US 7,285,143 B2
(45) Date of Patent: Oct. 23, 2007

(54) HYDROGEN GENERATOR

(75) Inventors: Hiromichi Sato, Atsugi (JP); Satoshi Aoyama, Susono (JP); Toshihide Nakata, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 1282 days.

(21) Appl. No.: 09/842,704

(22) Filed: Apr. 27, 2001

(65) Prior Publication Data

US 2001/0039759 A1 Nov. 15, 2001

(30) Foreign Application Priority Data

| | | |
|---|---|---|
| May 15, 2000 | (JP) | 2000-141127 |
| Jun. 13, 2000 | (JP) | 2000-176680 |
| Aug. 17, 2000 | (JP) | 2000-247663 |
| Dec. 27, 2000 | (JP) | 2000-396548 |

(51) Int. Cl.
*C10J 3/68* (2006.01)

(52) U.S. Cl. .......................................... 48/76

(58) Field of Classification Search ............... 48/61, 48/79, 127.9, 128, 118.5, 198.2, 198.3, 198.7; 422/188, 189, 190, 191, 193, 194, 198, 211, 422/222, 236

See application file for complete search history.

(56) References Cited

U.S. PATENT DOCUMENTS

| | | | | |
|---|---|---|---|---|
| 2,958,391 | A | | 11/1960 | DeRosset |
| 3,486,301 | A | | 12/1969 | Bonnet |
| 5,382,271 | A | * | 1/1995 | Ng et al. ................... 48/61 |
| 5,486,475 | A | | 1/1996 | Kramer et al. ............. 435/266 |
| 5,498,278 | A | | 3/1996 | Edlund |
| 5,885,727 | A | | 3/1999 | Kawatsu .................. 429/17 |
| 5,968,325 | A | * | 10/1999 | Oloman et al. ............ 204/230.5 |
| 6,332,913 | B1 | | 12/2001 | Breitschwerdt et al. |
| 6,653,005 | B1 | | 11/2003 | Muradov .................. 429/19 |
| 6,802,875 | B1 | | 10/2004 | Kimbara et al. ............. 48/61 |
| 6,841,280 | B2 | | 1/2005 | Iio et al. .................. 429/19 |

FOREIGN PATENT DOCUMENTS

| | | |
|---|---|---|
| DE | 1 091 990 | 11/1960 |
| DE | 1 939 638 | 2/1970 |
| DE | 3127475 A1 | 4/1982 |
| DE | 3127548 A1 | 4/1982 |
| DE | 198 60 253 C1 | 3/2000 |
| DE | 199 05 638 C1 | 6/2000 |
| EP | 0 796 647 A1 | 9/1997 |
| GB | 833837 | 5/1960 |
| GB | 2 080 144 A | 2/1982 |
| JP | 6-345408 | 12/1994 |
| JP | 10-297905 | 11/1998 |
| WO | WO 00/31816 | 6/2000 |

OTHER PUBLICATIONS

Official Letter from the German Patent Office regarding a counterpart German patent application dated Mar. 24, 2003 (German–language version and English–language translation).

* cited by examiner

*Primary Examiner*—Jonathan Johnson
*Assistant Examiner*—Rachel E. Beveridge
(74) *Attorney, Agent, or Firm*—Oliff & Berridge, PLC

(57) ABSTRACT

A hydrogen separation filter includes a plurality of hydrogen extraction layers, a plurality of separation layers with hydrogen separation films, and a plurality of reformed gas layers, which are laid one upon another in the sequence of the extraction layer, the separation layer, the reformed gas layer, and the separation layer to form a laminate structure. The respective layers are composed of porous ceramic material to ensure the required strength. The direction of the gas flow in the reformed gas layers and that in the extraction layers are respectively fixed to simplify the gas intake and discharge structure. The hydrogen separation filter is covered with a casing via a cushioning member to ensure the sufficient strength and the required sealing properties. A methanation catalyst that accelerates methanation of carbon monoxide is carried on either the separation layer or the extraction layer. This arrangement effectively relieves the adverse effects of contamination of resulting hydrogen with carbon monoxide, due to a pinhole or a partial damage of the layers.

52 Claims, 30 Drawing Sheets

TAKEN ON LINE A-A

REFORMED GAS

REFORMED GAS

PARTITIONS

REFORMED GAS

HYDROGEN GENERATOR

BACKGROUND OF THE INVENTION

1. Field of the Invention

The present invention relates to a hydrogen generator that generates hydrogen from a predetermined material containing hydrogen atoms.

2. Description of the Related Art

Fuel cells generate an electromotive force through the reaction of hydrogen and oxygen, which are supplied to an anode (hydrogen electrode) and a cathode (oxygen electrode) arranged across a hydrogen ion-permeating electrolyte layer. The supply of hydrogen fed to the anode is produced by chemical reactions, for example, reforming reactions of a predetermined material like methanol or natural gas provided as the fuel. The fuel like natural gas is decomposed to a gaseous mixture containing hydrogen through reactions expressed below:

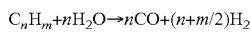

$C_nH_m + nH_2O \rightarrow nCO + (n+m/2)H_2$

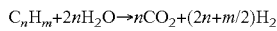

$C_nH_m + 2nH_2O \rightarrow nCO_2 + (2n+m/2)H_2$

Direct supply of the gaseous mixture to the fuel cells lowers the hydrogen partial pressure on the electrodes to interfere with the reactions on the electrodes. The direct supply may also cause carbon monoxide to damage the electrodes and interfere with the stable reactions. The general procedure thus separates hydrogen from the gaseous mixture and supplies only hydrogen to the fuel cells. A hydrogen separation film that allows selective permeation of hydrogen, for example, a palladium thin film, is used for separation of hydrogen. A known separation mechanism causes the gaseous mixture to pass through a cylinder of the hydrogen separation film, so as to extract hydrogen out of the cylinder. Another known mechanism utilizes a laminate structure, which includes layers of porous body with a catalyst for reforming reaction carried thereon, hydrogen separation layers, and spaces that allow the flow of extracted hydrogen (for example, the mechanism disclosed in JAPANESE PATENT LAID-OPEN GAZETTE No. 6-345408).

The cylindrical mechanism is, however, rather complicated in structure and disadvantageously increases the manufacturing cost and the size of the whole system. The drawbacks of the laminate structure are insufficient strength and possible leakage of the material gas into hydrogen due to the poor sealing properties. The arrangement of enhancing the strength and the sealing properties, however, causes another disadvantage, that is, the bulky laminate structure.

The hydrogen separation film is very thin, so that a pinhole in or a partial damage of the hydrogen separation film may cause carbon monoxide to be leaked to the hydrogen extraction side. As a measure against such leakage, a reaction unit, in which methanation of carbon monoxide proceeds to prevent the electrodes from being poisoned with carbon monoxide, may be provided after the hydrogen separation film. This arrangement, however, makes the hydrogen generator undesirably bulky. This measure also requires independent temperature regulation means for accelerating the methanation, thereby making the structure of the hydrogen generator undesirably complicated.

Application of the fuel cells for the vehicles have been attempted for practical use. It is thus highly demanded to reduce the size and the manufacturing cost of the hydrogen generator while enhancing the reliability and the strength thereof.

SUMMARY OF THE INVENTION

The object of the present invention is thus to provide a hydrogen generator that satisfies the above requirements. At least part of the above and the other related objects is attained by a hydrogen generator of a first arrangement that generates hydrogen from a predetermined material. The hydrogen generator of the first arrangement includes: a porous gaseous mixture layer through which a gaseous mixture including hydrogen passes; a hydrogen separation layer that allows only the hydrogen to selectively permeate therethrough for separation of the hydrogen; and a porous hydrogen extraction layer through which a hydrogen rich gas passes. The hydrogen rich gas mainly contains the hydrogen selectively permeating the hydrogen separation layer. Here the respective layers form a laminate structure, in which the hydrogen separation layer is interposed between the gaseous mixture layer and the hydrogen extraction layer.

In the hydrogen generator of the first arrangement, the respective layers are composed of a porous body, such as a ceramic body. This arrangement effectively enhances the strength of the laminate structure and reduces the whole size of the hydrogen generator. The laminate structure is relatively easily manufactured and thus advantageously reduces the manufacturing cost of the hydrogen generator. The porous body also functions as gas conduits. Especially preferable is accordingly the foam, that is, the porous body of high porosity prepared by firing the mixture of expandable urethane and ceramic material. The porous body is not restricted to ceramics but may be composed of a metal resin.

In the hydrogen generator of the first arrangement, it is preferable that a cushioning member is interposed between the hydrogen separation layer and the adjoining porous layer. The cushioning member may be composed of glass wool, carbon cloth, or carbon paper having heat resistance and flame resistance. This structure prevents the hydrogen separation layer from coming into direct contact with the adjoining porous layer. This effectively protects the hydrogen separation layer from potential damages and enhances the shock resistance and vibration damping properties of the hydrogen generator.

For the same purpose, it is also preferable that at least one of the hydrogen separation layer and the porous layer has a preventive mechanism that prevents the whole surface of the hydrogen separation layer from being in direct contact with the adjoining porous layer. The preventive mechanism may be, for example, a jagged surface formed on at least one of the hydrogen separation layer and the porous layer or spacer-like projections formed on part of the circumference of at least one layer. The preventive mechanism may, however, not be formed integrally with at least one layer but may be constructed as a separate spacer.

The hydrogen generator of the present invention may have a second arrangement, where a gas inlet into the gaseous mixture layer, a gas outlet from the gaseous mixture layer, a gas inlet into the hydrogen extraction layer, and a gas outlet from the hydrogen extraction layer are arranged in predetermined directions in preset side faces of the laminate structure. In the second arrangement, the hydrogen extraction layer may be a hollow body, instead of the porous body.

For example, in the laminate structure of rectangular layers, the four side faces are allocated respectively to the gas inlet into and the gas outlet from the gaseous mixture layer and the gas inlet into and the gas outlet from the hydrogen extraction layer. The arrangement of the respective gas inlets and gas outlets in the predetermined directions in the preset side faces ensures the efficient gas supply and discharge into and from the laminate structure of the plural layers. This arrangement also reduces the size of joints between piping for the gas supply and the gas discharge and the laminate structure. The gas inlet into the hydrogen extraction layer is used for supply of a purge gas, on which the extracted hydrogen is carried. The supply of the purge gas effectively prevents an increase in hydrogen partial pressure in the hydrogen extraction layer and thereby enhances the efficiency of hydrogen extraction. A condensable gas like steam or an inert gas may be used for the purge gas. In the case where the purge gas is not used for extraction of hydrogen, three side faces of the laminate structure are allocated to the gas inlet into and the gas outlet from the gaseous mixture layer and the gas outlet from the hydrogen extraction layer.

In the hydrogen generator of the second arrangement, the laminate structure includes a plurality of the gaseous mixture layers and a plurality of the hydrogen extraction layers, and at least either of the plurality of gaseous mixture layers and the plurality of hydrogen extraction layers are connected to allow the corresponding gas to successively flow through at least part of the plurality of layers in series.

When the gas flow path does not have a sufficient length, hydrogen contained in the gaseous mixture flown through the laminate structure may not be sufficiently transmitted to the hydrogen extraction layer. This is because the transmission rate of hydrogen through the hydrogen separation layer has an upper limit. The arrangement of making the hydrogen-containing gaseous mixture successively flow through the gaseous mixture layers in series extends the flow path length per unit volume and thereby raises the total quantity of hydrogen transmitted to the hydrogen extraction layer. The connection is not required to make the corresponding gas flow through all the layers in series, but should be designed to allow the gas to flow through part of the layers in series.

The arrangement of the present invention has the advantage discussed below, from the viewpoint of the hydrogen partial pressure. In the hydrogen generator of the laminate structure, the method of gas flow may cause a site having a small difference in hydrogen partial pressure between the gaseous mixture layer and the hydrogen extraction layer, thereby reducing the total quantity of hydrogen transmission. For example, it is assumed that the laminate structure consists of rectangular layers. FIG. 31A through 31C shows distributions of hydrogen partial pressure difference between the gaseous mixture layer and the hydrogen extraction layer when the reformed gas (gaseous mixture) is flown through the gaseous mixture layers in series. In the gaseous mixture layers, hydrogen is extracted along a path from the inlet to the outlet of the reformed gas, so that the hydrogen partial pressure decreases along this path. In the hydrogen extraction layers, on the other hand, the hydrogen partial pressure increases along a path from the inlet to the outlet of the purge gas. A site in the vicinity of the inlets of the reformed gas and the purge gas accordingly has a large hydrogen partial pressure difference, whereas a site in the vicinity of the outlets of the reformed gas and the purge gas has a small hydrogen partial pressure difference. FIG. 31B shows the distribution of the hydrogen partial pressure difference between a gaseous mixture layer A and the hydrogen extraction layer. FIG. 31C shows the distribution of the hydrogen partial pressure difference between a gaseous mixture layer B and the hydrogen extraction layer. The arrangement of making the reformed gas successively flow through the gaseous mixture layers in series in the laminate structure means that the reformed gas flows in adjoining gaseous mixture layers are opposed to each other. As clearly understood from FIGS. 31B and 31C, the variation in hydrogen partial pressure difference is inverted in the flow direction of the reformed gas (in the direction of the axis X). The distribution of the hydrogen partial pressure difference is accordingly averaged in the direction of the axis X in the hydrogen extraction layers. In a similar manner, the purge gas is successively flown through the hydrogen extraction layers in series. This averages the distribution of the hydrogen partial pressure difference among the respective hydrogen extraction layers in the whole laminate structure. This arrangement advantageously increases the quantity of transmission of hydrogen from the gaseous mixture layer to the hydrogen extraction layer.

In the hydrogen generator of the second arrangement, at least either of the gaseous mixture layer and the hydrogen extraction layer in the laminate structure may be designed to allow the corresponding gas to flow in a serpentine manner.

One applicable structure provides partitions for restricting the gas flow in the respective layers, so as to attain the serpentine gas flow. This structure also extends the gas flow path and averages the distribution of the hydrogen partial pressure difference, thus advantageously increasing the quantity of transmission of hydrogen from the gaseous mixture layer to the hydrogen extraction layer. Here the 'serpentine gas flow' is not restricted to the S-shaped or the connecting S-shaped gas flow but includes the U-shaped gas flow. When each constituent of the laminate structure has a plurality of layers, the gas may be flown in a serpentine manner in all the layers or in only part of the layers.

In the hydrogen generator of the above application, the gas inlet into and the gas outlet from either of the gaseous mixture layer and the hydrogen extraction layer may be located in one identical direction of the laminate structure. This arrangement allows the compact layout of piping in the hydrogen generator and thereby reduces the whole size of the hydrogen generator.

In the hydrogen generator of either the first or the second arrangement, although the hydrogen separation layer may be formed as an integral face of a large area, it is preferable that the hydrogen separation layer includes a plurality of small base members with a hydrogen separating metal carried thereon and a support mechanism that supports the plurality of small base members in a two-dimensional arrangement.

The hydrogen separation layer is required to have the sufficient strength as well as the less thickness for the better hydrogen transmission rate. The base members of the small area enhance the flexural strength of the whole hydrogen separation layer. The plurality of small-area base members with the hydrogen separating metal carried thereon are held in a two-dimensional arrangement by the support mechanism of the high strength. This arrangement ensures the enhanced strength of the hydrogen separation layer, which allows reduction of the thickness of the hydrogen separation layer and thus improves the hydrogen transmission rate.

It is preferable to homogeneously distribute the hydrogen separating metal in the hydrogen separation layer. This gives the homogeneous hydrogen separation performance to the hydrogen separation layer. The greater area of the hydrogen separation layer makes it more difficult to ensure the homogeneous distribution of the hydrogen separating metal. Namely it is more difficult to manufacture the hydrogen separation layer of the greater area from the viewpoint of the homogeneous distribution of the hydrogen separation performance. Manufacture of the hydrogen separation layer of the large area accordingly has a low yield. The two-dimensional arrangement of the small-area base members in the hydrogen separation layer advantageously enhances the yield in the manufacture of the hydrogen separation layer.

For example, the support mechanism may be a frame having recesses that accommodate the plurality of small base members therein.

This structure facilitates the manufacture of the hydrogen separation layer. When the surface of the small base members fitted in the recesses is concaved from the surface of the frame, the frame also functions as a spacer that prevents the whole surface of the hydrogen separation layer (including the plurality of small base members) from being in direct contact with the porous layer. The shape of the small base members is not specifically restricted, but may be polygonal or circular.

The hydrogen generator of either the first or the second arrangement may further include a gas-tight casing member that covers over the whole laminate structure. This structure effectively prevents leakage of the gas from the laminate structure or mixing of the different gases, thereby enhancing the sealing properties. The casing member also protects the laminate structure from external shocks. The casing member may be composed of any material and any shape according to the requirements, but is preferably made of a metal.

In accordance with one preferable application, the casing member has manifolds that respectively connect with a gas inlet into and a gas outlet from the gaseous mixture layer and with a gas inlet into and a gas outlet from the hydrogen extraction layer and allow the gas to be flown from outside to the laminate structure and flown out of the laminate structure to the outside. This arrangement facilitates the supply and discharge of the gas to and from each layer. When the purge gas is supplied to the hydrogen extraction layer, four manifolds are provided to connect with the respective gas inlets and gas outlets. When the purge gas is not supplied, three manifolds are provided. A diversity of structures are applicable for the gas supply and the gas discharge between the manifolds and the laminate structure.

In the hydrogen generator of the above application, it is preferable that the manifold has a gas flow rate regulation mechanism that is arranged in a neighborhood of each of the gas inlets into the gaseous mixture layer and the hydrogen extraction layer to regulate the gas flow rate of the corresponding intake gas to a fixed value. The gas flow rate regulation mechanism may be a baffle plate with orifices.

This arrangement practically averages the distribution of the hydrogen partial pressure difference among the respective gaseous mixture layers, thus enabling a substantially constant quantity of hydrogen to be transmitted to each hydrogen extraction layer. This ensures the efficient separation of hydrogen.

In the hydrogen generator of the above application, it is also preferable that the casing member has a gas leakage prevention mechanism that prevents leakage of any gas and is provided in at least part of a space between the gas inlet into the gaseous mixture layer and the gas inlet into the hydrogen extraction layer, a space between the gas inlet into the gaseous mixture layer and the gas outlet from the hydrogen extraction layer, a space between the gas outlet from the gaseous mixture layer and the gas inlet into the hydrogen extraction layer, and a space between the gas outlet from the gaseous mixture layer and the gas outlet from the hydrogen extraction layer.

This structure effectively prevents leakage of the gas even when each joint between the laminate structure and the manifold does not have the perfect gas tightness.

The gas leakage prevention mechanism may include a flow path that allows a predetermined gas having a higher pressure than the gas pressures at the gas inlet and the gas outlet to flow toward the gas inlet and the gas outlet.

The arrangement of making the predetermined gas of the high pressure flow toward the gas inlet and the gas outlet effectively separates the gas flows from each other and prevents leakage of the gas even when there is a site of poor gas tightness.

The predetermined gas flown through the flow path in the gas leakage prevention mechanism may be steam.

As described previously, the hydrogen generator generates hydrogen through the chemical reactions of the material gas and water. Steam is accordingly used in the prior art hydrogen generators. This application does not require a specific gas to be newly provided for the gas leakage prevention mechanism and thus facilitates the construction of the gas leakage prevention mechanism.

It is also preferable that a cushioning member is interposed between the casing member and the laminate structure. The cushioning member may be, for example, glass wool having heat resistance and flame resistance. The function of the cushioning member ensures the sealing properties between the laminate structure and the casing member and relieves the external shocks applied to the laminate structure via the casing member. The cushioning member also functions to relieve a thermal stress due to the difference in coefficient of thermal expansion between the casing member and the laminate structure.

A diversity of methods may be applied to form the gas flow path in each porous layer. In one possible application, the porous layer includes a regulation structure that is a denser portion formed on part of a side face of the porous layer and regulates a flow direction of the gas in the porous layer. For example, the part of the side face may be composed of dense ceramics. This arrangement enables the gas flow path to be formed integrally with the porous layer, thus advantageously facilitating the manufacture. Application of the dense structure to opposite sides of the rectangular layer enhances the sealing properties in the areas close to the corners of the rectangular structure.

The hydrogen generator of either the first or the second arrangement may further include sealing members to mutually seal the gas inlet into the gaseous mixture layer, the gas outlet from the gaseous mixture layer, the gas inlet into the hydrogen extraction layer, and the gas outlet from the hydrogen extraction layer against one another. This structure effectively prevents different gases from being mixed. The sealing members may be actualized by coating areas of interest with alumina, glass, or any other appropriate material. In the case where the gas inlets and gas outlets are provided in the respective side faces of the laminate structure of rectangular layers, the areas of interest are in the vicinity of the corners of the rectangular laminate. The areas in the vicinity of the corners of the rectangle are often subject to damages to lower the sealing properties. The arrangement of providing separate sealing members accordingly has significant advantages on such areas.

In the hydrogen generator of either the first or the second arrangement, the laminate structure may be constructed by laying an arbitrary number of layers. In accordance with one preferable application, the respective layers form the laminate structure in such a manner that the hydrogen extraction layers are located on both ends of the laminate structure. Namely the hydrogen extraction layers are present on both sides of all the gaseous mixture layers. This arrangement ensures the efficient extraction of hydrogen.

The present invention is actualized by a mechanism that receives supply of a gaseous mixture containing hydrogen and separates the hydrogen. The present invention is also actualized by a mechanism that receives supply of a predetermined material containing hydrogen atoms, generates hydrogen through a chemical reaction of the predetermined material, and separates the generated hydrogen. In the latter case, the gaseous mixture layer has a catalyst carried thereon, which accelerates a predetermined chemical reaction according to the material gas. The chemical reaction may be a reforming reaction or a shift reaction. In the case where the crude material like methanol or natural gas is supplied, a catalyst for accelerating the reforming reaction is carried on the gaseous mixture layer. In the case where the gaseous mixture after the reforming reaction is supplied, a catalyst for accelerating the shift reaction is carried on the gaseous mixture layer. The chemical reaction is not restricted to the reaction that produces hydrogen. In the case of supply of the gaseous mixture, the chemical reaction may selectively oxidize carbon monoxide included in the gaseous mixture. This arrangement effectively prevents the hydrogen from being contaminated with carbon monoxide, which is harmful to the fuel cells, even when the hydrogen separation layer has a pinhole.

In the present invention, a variety of structures are applicable for the hydrogen separation layer. Known examples of the hydrogen separation layer include films of palladium or palladium-silver alloy and ceramic or other porous support bodies coated with such metal, for example, by chemical vapor deposition (CVD) or physical vapor deposition (PVD). It is also preferable that the hydrogen separation layer is a porous support body having pores filled with a hydrogen separating metal. This hydrogen separation layer is obtained by making the pores of the ceramic or another porous support body filled with fine particles of palladium or another hydrogen separating metal. The hydrogen separation layer of this structure may be obtained by impregnating the porous support body with a solution of the hydrogen separating metal, that is, the carrier impregnation method. Another method applies paste of an organic solvent containing the hydrogen separating metal on the surface of the porous support body and firing the pasted porous support body. The structure of making the pores of the porous support body filled with the fine particles of hydrogen separating metal increases the contact area of the gaseous mixture with the hydrogen separating metal and enhances the efficiency of hydrogen separation. Another advantage is to enhance the strength of the hydrogen separation layer.

As the measure against contamination of hydrogen in the hydrogen extraction layer with carbon monoxide, for example, due to the presence of a pinhole in the hydrogen separation layer, it is preferable that the hydrogen generator of the present invention further includes a carbon monoxide concentration reduction layer that is located in a flow path of the hydrogen rich gas, which mainly contains the separated hydrogen, and has a specific catalyst carried thereon for accelerating a chemical reaction to lower concentration of carbon monoxide included in the hydrogen rich gas. This arrangement effectively relieves the adverse effects of carbon monoxide even when the hydrogen is contaminated with carbon monoxide. This structure is especially advantageous when the resulting hydrogen is supplied to fuel cells, since the electrodes in the fuel cells are readily poisoned by carbon monoxide.

A diversity of catalysts, for example, the catalyst for selectively oxidizing carbon monoxide, may be used for the specific catalyst. In accordance with a preferable application, the specific catalyst is a catalyst for methanation of carbon monoxide. Concrete examples are catalysts containing any of nickel (Ni), ruthenium (Ru), and rhodium (Rh). These catalysts may be used alone or in combination with other catalysts. The methanation of carbon monoxide is expressed by the following equation. When carbon dioxide is present in the gas, methanation of carbon dioxide proceeds simultaneously.

$$CO+3H_2 \rightarrow 2H_2O+CH_4$$

$$CO_2+4H_2 \rightarrow 3H_2O+CH_4$$

As is known in the art, the methanation proceeds at temperatures of not lower than approximately 140° C. The reforming reaction generally proceeds at temperatures of 300 to 800° C. according to the crude material. The supply of the hot reformed gas desirably accelerates the methanation without any specific temperature regulation.

The methanation is the reaction of carbon monoxide or carbon dioxide with hydrogen as shown by the above equations. Namely only the components present in the gas transmitted through the hydrogen separation layer are sufficient for the reactions. No special mechanism is required to supply a specific gas separately to the carbon monoxide concentration reduction layer for the reactions. This arrangement thus desirably simplifies the structure of the whole hydrogen generator, while effectively reducing the concentration of carbon monoxide.

The carbon monoxide concentration reduction layer may be attained in a variety of applications. In accordance with one preferable application, in the case where the hydrogen separation layer includes a hydrogen separation film integrally formed with a porous support body, the carbon monoxide concentration reduction layer is obtained by making the specific catalyst carried in one site of the porous support body where the hydrogen separation film is not formed. In this applications, the hydrogen separation film and the carbon monoxide concentration reduction layer are integrally formed with the porous support body. The carbon monoxide concentration reduction layer is not mixed with the hydrogen separation film but is located after the hydrogen separation film along the flow path.

In this application, the hydrogen separation layer constructed as the hydrogen separation film integrated with the porous support body may be obtained by making pores of the porous support body filled with the hydrogen separating metal, by applying the hydrogen separation film on the surface of the porous support body, or by coating the surface of the porous support body with the hydrogen separation film. The carbon monoxide concentration reduction layer may be obtained by coating the opposite face of the porous support body, which is opposed to the surface with the hydrogen separation film formed thereon, with the specific catalyst or by making the specific catalyst carried on the porous support body. In the former structure, a variety of methods are applicable; for example, the vapor deposition method like physical vapor deposition (PVD) or chemical vapor deposition (CVD), the plating method, and the coating method that applies slurry of alumina powder or another ceramic powder with the specific catalyst carried thereon. In the latter structure, the various methods discussed above with regard to the hydrogen separating metal are applicable to make the specific catalyst carried on the porous support body. In the case of metal porous support bodies like metal celmet, in order to prevent the specific catalyst from being combined with the metal support body to form an alloy, the desirable method causes the specific catalyst to be carried on the metal support body coated with a ceramic material like alumina.

In accordance with another preferable application, the carbon monoxide concentration reduction layer is integrally formed with the hydrogen extraction layer by making the specific catalyst carried in the hydrogen extraction layer. In the case where the hydrogen extraction layer is a porous support body, the specific catalyst is carried on the porous support body. In the case where the hydrogen extraction layer is a hollow body, the hollow is filled with pellets of the specific catalyst. In the structure where the carbon monoxide concentration reduction layer is integrally formed with the hydrogen extraction layer, a variety of separation films, such as ceramic, resin, and other porous separation films, instead of the arrangement of making the hydrogen separating metal carried on the porous support body, are applicable for the hydrogen separation layer.

The present invention is also directed to a hydrogen generator of a third arrangement that generates hydrogen from a predetermined material. The hydrogen generator of the third arrangement includes: a gaseous mixture layer through which a gaseous mixture including hydrogen passes; a hydrogen separation layer that allows only the hydrogen to selectively permeate therethrough for separation of the hydrogen; and a hydrogen extraction layer through which a hydrogen rich gas passes, the hydrogen rich gas mainly containing the hydrogen selectively permeating the hydrogen separation layer. Here each of the gaseous mixture layer and the hydrogen extraction layer is constructed as a metal frame having a gas inlet and a gas outlet on side faces thereof, and the respective layers form a laminate structure by joining the metal frames with each other in such a manner that the hydrogen separation layer is interposed between the gaseous mixture layer and the hydrogen extraction layer.

The metal frame is readily processed, and the above arrangement enhances the strength of the laminate structure. The metal material is readily joined with the other constituents of the hydrogen generator.

The gas-tight casing member with manifolds and the gas leakage prevention mechanism discussed above are applicable to the laminate structure of the metal frames and exert the same effects as those discussed above.

In the hydrogen generator of the third arrangement, it is preferable that the metal frames respectively have flow path defining members that are connected to each other to form a gas flow path, which allows a gas to be flown in a laminating direction and to be flown into the gas inlet and flown out of the gas outlet when the metal frames are joined with each other in the laminate structure.

This application readily and securely actualizes the functions of the manifolds and the gas leakage prevention mechanism discussed above. In one preferable embodiment of the hydrogen generator of the above application, the laminate structure includes a plurality of the gaseous mixture layers and a plurality of the hydrogen extraction layers, and the gas flow path is arranged to allow a predetermined gas to flow in parallel through at least either of the plurality of gaseous mixture layers and the plurality of hydrogen extraction layers.

In another preferable embodiment of the hydrogen generator of the above application, the flow path defining member has a gas flow cutoff element that is formed in at least part of the flow path defining member to cut off the gas flow in the laminating direction. The gas flow cutoff element functions to allow a predetermined gas to flow in series through at least either of the plurality of gaseous mixture layers and the plurality of hydrogen extraction layers.

In this embodiment, it is preferable to make at least the gaseous mixture successively flow through the plurality of gaseous mixture layers in series. This arrangement extends the flow path of the gaseous mixture and thereby increases the quantity of hydrogen transmitted to the hydrogen extraction layer.

There are no specific restrictions on the shape of the metal frames and the positions of the gas inlets and the gas outlets.

In accordance with one preferable embodiment, the metal frame has a configuration of 4-fold symmetry about an axis in the laminating direction, and the gas inlet and the gas outlet are located at opposite positions in a plane perpendicular to the laminating direction.

Here the n-fold symmetry means that an object rotated about the axis of rotation by 360/n degrees perfectly coincides with the non-rotated object. The 'configuration of 4-fold symmetry' accordingly represents the shape that becomes coincident at every rotation of 90 degrees. The configuration of 4-fold symmetry allows the metal frames of the identical shape to be laid one upon another with rotations of 90 degrees via the hydrogen separation layers to complete the laminate structure. This arrangement advantageously reduces the number of parts included in the hydrogen generator.

In the hydrogen generator of the third arrangement, it is also preferable that the laminate structure has a flow path that allows a flow of a predetermined gas having a higher pressure than the gas pressures in the gaseous mixture layer and the hydrogen extraction layer as a gas leakage prevention mechanism that prevents leakage of the gas between the gaseous mixture layer and the hydrogen extraction layer.

Even when the laminate structure has a site of poor gas tightness, the predetermined gas is leaked from the site. This effectively prevents the gases in the gaseous mixture layer and the hydrogen extraction layer from being mixed with each other and allows the desired gases to flow through the desired flow paths. In this application, the gas leakage prevention mechanism is readily integrated with the metal frames of the gaseous mixture layer and the hydrogen extraction layer.

The predetermined gas flown through the flow path of the gas leakage prevention mechanism is, for example, steam.

As described previously, the hydrogen generator generates hydrogen through the chemical reactions of the material gas and water. Steam is accordingly used in the prior art hydrogen generators. This application does not require a specific gas to be newly provided for the gas leakage prevention mechanism and thus facilitates the construction of the gas leakage prevention mechanism.

The hydrogen generator of the present invention is extensively applicable to systems that require generation of hydrogen. One possible application is a system that generates a gaseous fuel to be supplied to fuel cells. For example, the system mounted on a vehicle generates hydrogen and supplies the generated hydrogen to fuel cells mounted on the vehicle. These and other objects, features, aspects, and advantages of the present invention will become more apparent from the following detailed description of the preferred embodiments with the accompanying drawings.

DESCRIPTION OF THE PREFERRED EMBODIMENTS

A. First Embodiment

Figure 1:
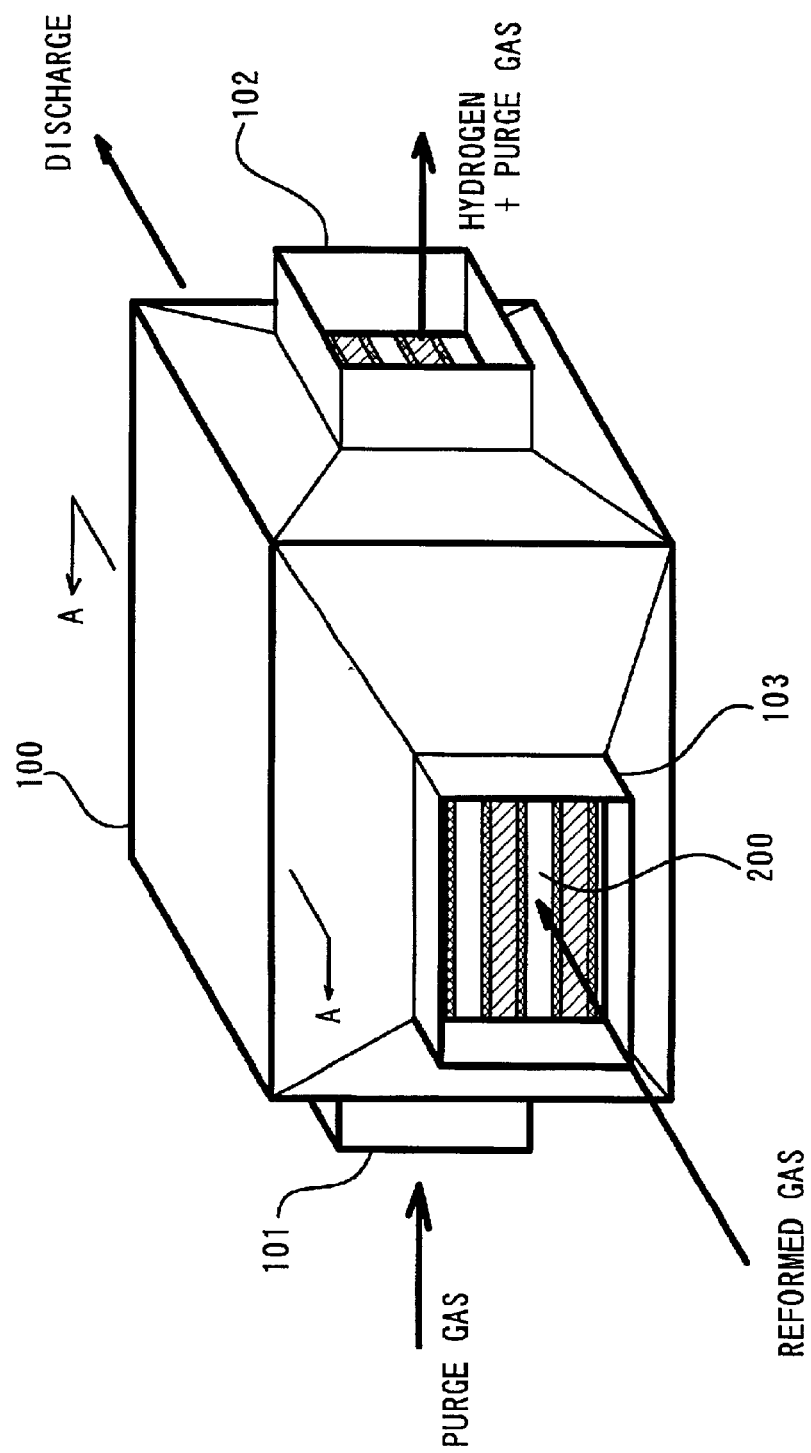
FIG. 1 is a perspective view illustrating the structure of a hydrogen separation mechanism included in a hydrogen generator in a first embodiment of the present invention.

FIG. 1 is a perspective view illustrating the structure of a hydrogen separation mechanism included in a hydrogen generator in a first embodiment of the present invention. The hydrogen generator first reforms a predetermined material, such as methanol or natural gas, and produces a reformed gas containing hydrogen and carbon monoxide. The hydrogen separation mechanism extracts hydrogen from the reformed gas to generate a hydrogen rich gas. The hydrogen rich gas is used, for example, for a gaseous fuel of fuel cells. The unit of reforming the material may have any known structure and is thus omitted from the illustration of FIG. 1.

The hydrogen separation mechanism of the embodiment includes a hydrogen separation filter 200 that utilizes a hydrogen separation film having the characteristic of allowing selective transmission of hydrogen to separate hydrogen, and a casing 100 that covers the hydrogen separation filter 200. When the reformed gas and a purge gas, on which extracted hydrogen is carried, are supplied to the hydrogen separation mechanism, the hydrogen separation filter 200 functions to separate and extract hydrogen and discharge the extracted hydrogen on the flow of the purge gas. The residual reformed gas after separation of hydrogen is flown out as gaseous exhaust. A condensable gas like steam or an inert gas may be used for the purge gas.

As shown in FIG. 1, the casing 100 has a reformed gas inlet manifold 103 formed in a front face thereof for taking in a supply of the reformed gas. A purge gas inlet manifold 101 for taking in a supply of the purge gas is formed in a left side face, and a discharge manifold 102 for discharging extracted hydrogen on the flow of the purge gas is formed in a right side face. An exhaust manifold for flowing out the remaining reformed gas after separation of hydrogen is formed in a rear face of the casing 100 that is not seen in the illustration of FIG. 1.

Figure 2:
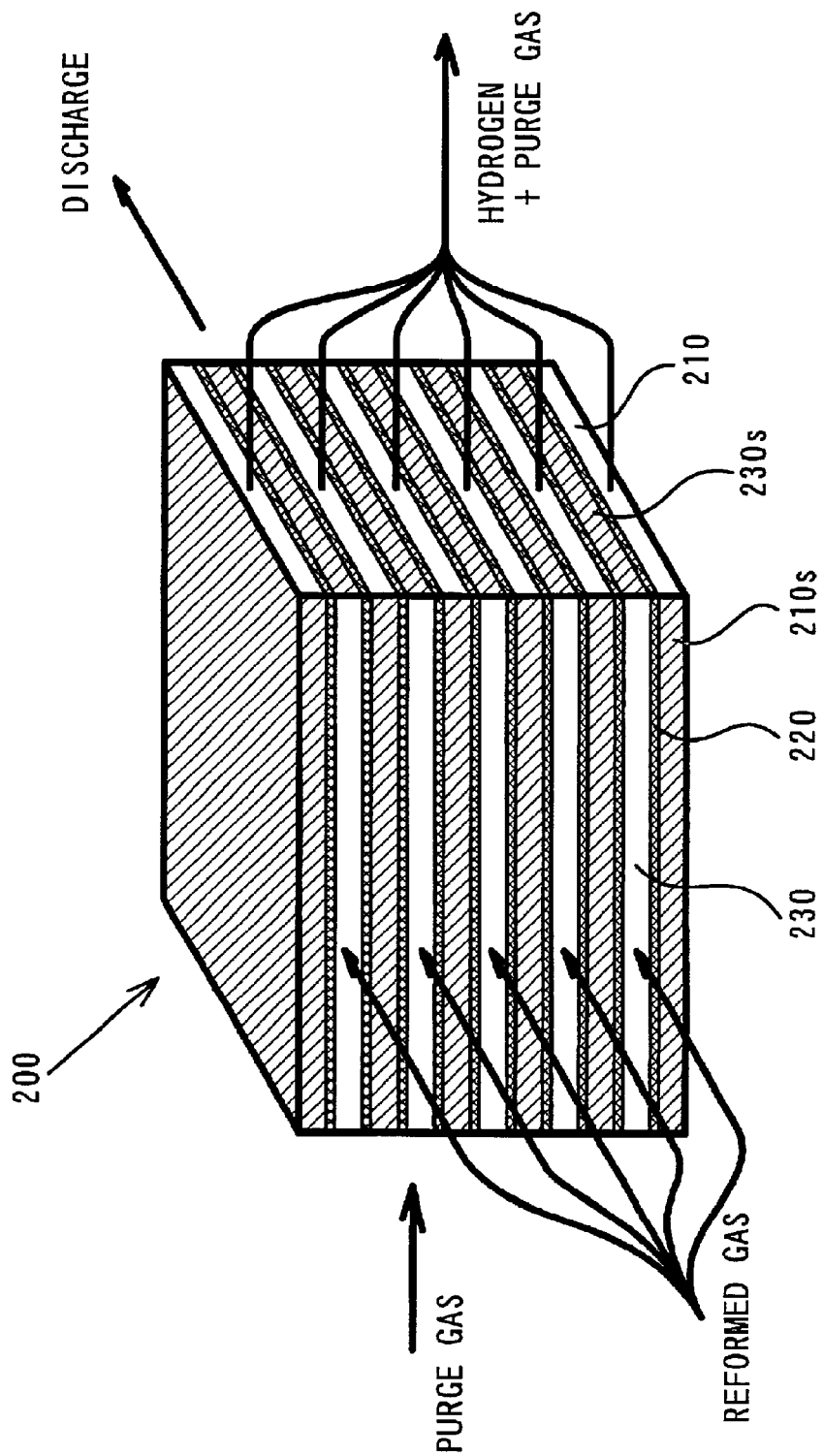
FIG. 2 is a perspective view schematically illustrating the structure of a hydrogen separation filter 200 in the first embodiment.

FIG. 2 is a perspective view schematically illustrating the structure of the hydrogen separation filter 200. The hydrogen separation filter 200 is constructed by laying three different rectangular layers one upon another, that is, reformed gas layers 230 that allow transmission of the reformed gas, separation layers 220 that separate and extract hydrogen from the flow of the reformed gas, and extraction layers 210 that allow transmission of the extracted hydrogen on the flow of the purge gas. The laminate is formed by laying the extraction layer 210, the separation layer 220, the reformed gas layer 230, and the separation layer 220 one upon another in this sequence. Both the lower most layer and the upper most layer are the extraction layers 210. This arrangement of the laminate causes each reformed gas layer 230 to be interposed between the extraction layers 210, thus enhancing the efficiency of hydrogen separation. Another arrangement of the laminate where the lower most layer and the upper most layer are not the extraction layers 210 may be adopted according to the requirements.

The reformed gas layer 230 and the extraction layer 210 are respectively composed of a porous ceramic body. In this embodiment, for the smooth gas flow, the ceramic porous body generally called foam is applied for both the reformed gas layer 230 and the extraction layer 210. The foam is the porous material that is prepared by firing the mixture of expandable urethane and ceramic material and has only the ceramic skeleton left in the vacant spaces of expandable urethane.

Sealing members 230s and 210s are attached to the side faces of the reformed gas layers 230 and the extraction layers 210 to prevent leakage of the gas. The hatched portions in FIG. 2 represent the sealing members. Alumina, glass, or another suitable material is applied for the sealing members 230s and 210s. As clearly seen in the illustration of FIG. 2, the upper and the lower faces of the hydrogen separation filter 200 are also sealed.

The reformed gas layers 230 and the extraction layers 210 are laid one upon another to fulfill the conditions that all the reformed gas layers 230 have an identical direction of the gas flow and that all the extraction layers 210 have another identical direction of the gas flow, which is perpendicular to the direction of the gas flow in the reformed gas layers 230. This arrangement enables all the four side faces of the hydrogen separation filter 200 to be used for supply or discharge of the gas. For example, the supply of the reformed gas introduced via the reformed gas inlet manifold 103 separately flows through the respective reformed gas layers 230 and is again collected to be flown out of the exhaust manifold formed in the rear face. The supply of the purge gas introduced via the purge gas inlet manifold 101 separately flows through the respective extraction layers 210 and is again collected to be discharged from the discharge manifold 102 formed in the right face. The consistent direction of the gas flow in each of the reformed gas layers 230 and the extraction layers 210 advantageously simplifies the structure of the manifolds. The arrangement of the reformed gas layers 230 and the extraction layers 210 is, however, not required to satisfy the above conditions, as long as the arrangement ensures that the required gases are fed to and discharged from the respective layers.

Figure 3:
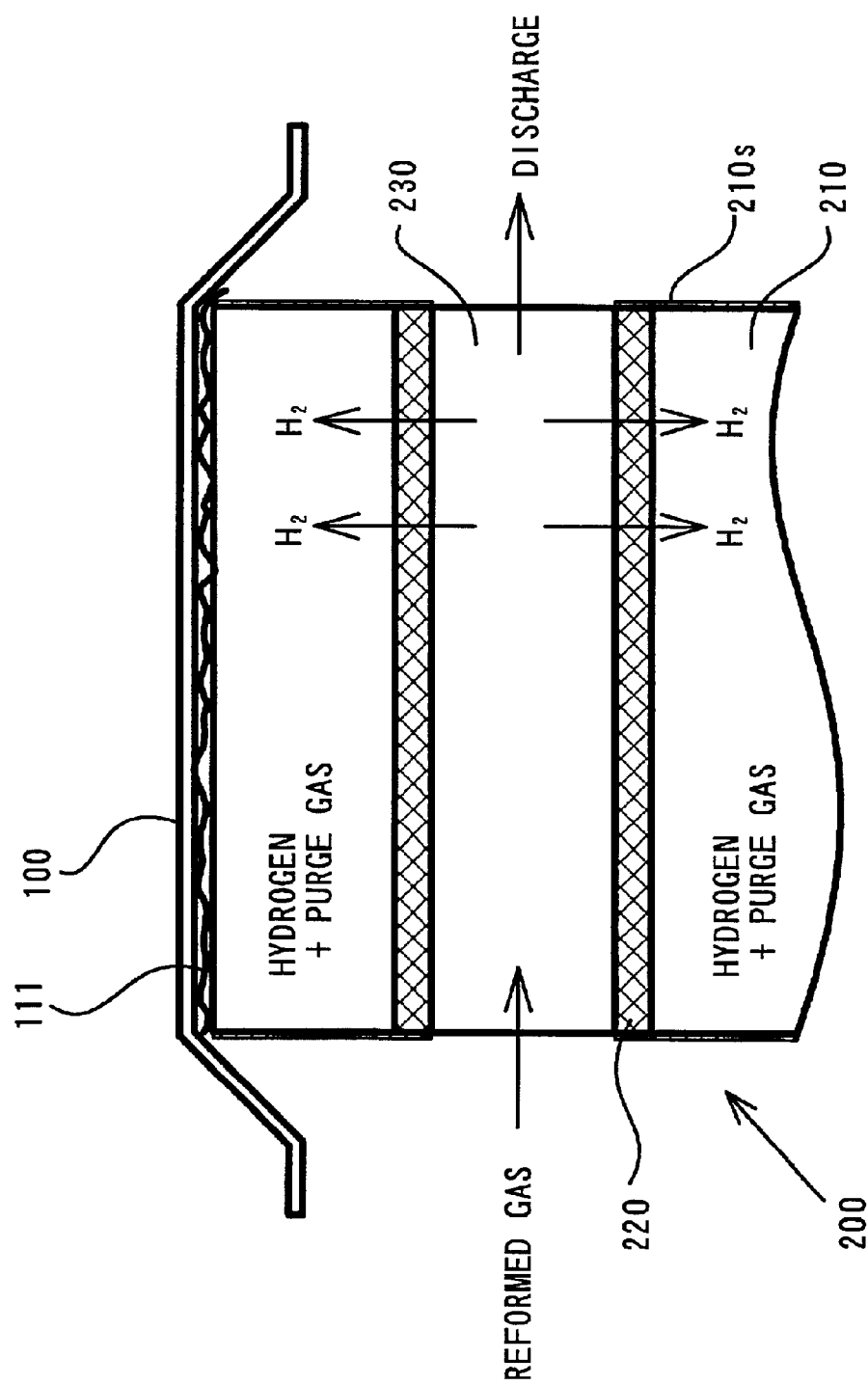
FIG. 3 is an enlarged sectional view illustrating the joint of the hydrogen separation filter 200 with a casing 100.

FIG. 3 is an enlarged sectional view illustrating the joint of the hydrogen separation filter 200 with the casing 100. This is taken on the line A—A in FIG. 1. The hydrogen separation filter 200 is joined with the casing 100 via a cushioning member 111. A material having good heat resistance and flame resistance, for example, glass wool, is preferably applied for the cushioning member 111. The cushioning member 111 effectively prevents leakage of the gas from the clearance between the hydrogen separation filter 200 and the casing 100, while reliving an external force applied to the hydrogen separation filter 200 via the casing 100 and a thermal stress due to the difference in coefficient of thermal expansion between the casing 100 and the hydrogen separation filter 200.

The process of separating hydrogen is also shown in FIG. 3. The reformed gas flows through the reformed gas layers 230 rightward in the drawing. The purge gas flows through the extraction layers 210 in the direction perpendicular to the sheet surface. The side faces of the extraction layers 210 are covered with the sealing members 210s to prevent leakage of the gas to the left or to the right. Hydrogen included in the reformed gas flowing through the reformed gas layer 230 is extracted into the upper and lower extraction layers 210 by the function of the separation layers 220 and is discharged on the flow of the purge gas to the outside.

Figure 4:
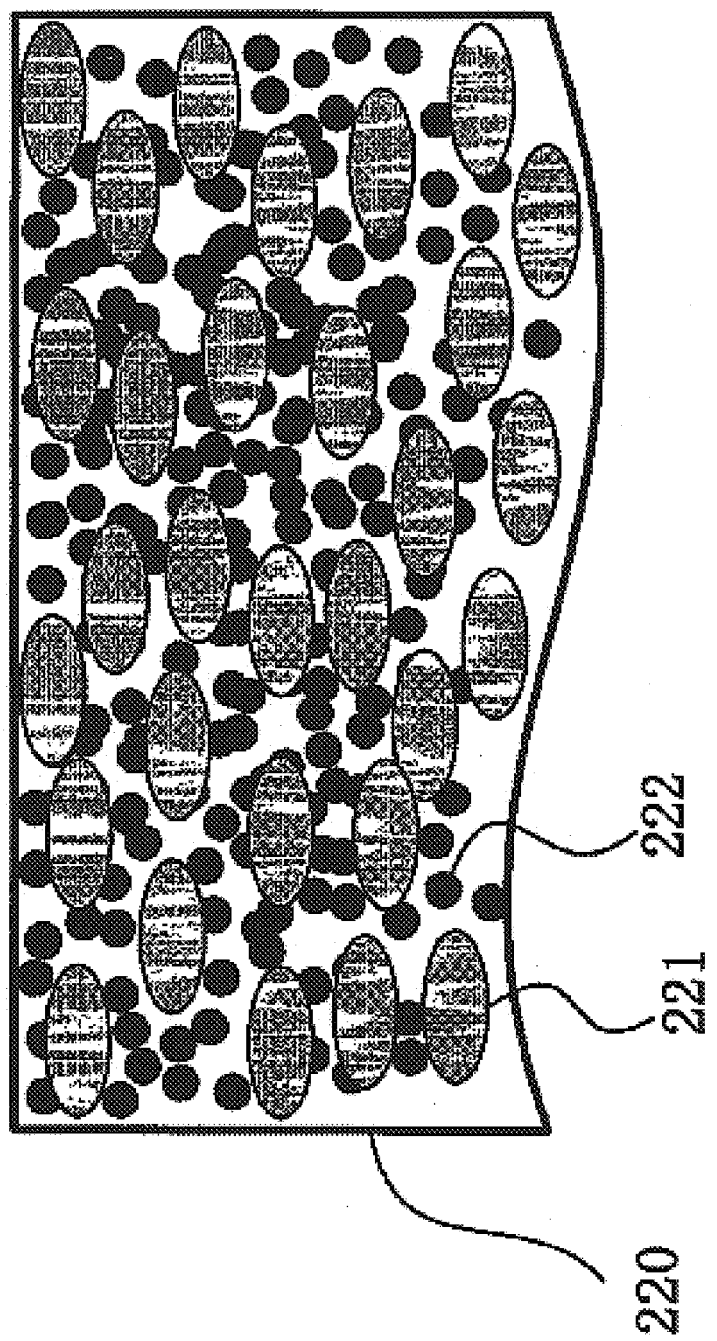
FIG. 4 is an enlarged sectional view schematically illustrating the internal structure of a separation layer 220.

FIG. 4 is an enlarged sectional view schematically illustrating the internal structure of the separation layer 220. In the separation layer 220 of the embodiment, pores of a porous support body 221, for example, a ceramic support body, are filled with a separating metal 222 having hydrogen selective permeability. In the actual state, fine particles of the separating metal 222 are carried to substantially occupy the volume of the pores. Palladium or palladium alloy may be applied for the separating metal 222. The separation layer 220 of this structure may be obtained by impregnating the porous support body 221 with a solution of the separating metal 222, that is, the carrier impregnation method. Another method applies paste of an organic solvent containing the separating metal 222 on the surface of the porous support body 221 and firing the pasted porous support body 221. The structure of making the pores of the porous support body 221 filled with the separating metal 222 enables the flow of the reformed gas to be in contact with the separating metal 222 inside the separation layer 220 Compared with a thin film of the separating metal alone, this arrangement increases the contact area of the reformed gas with the separating metal and enhances the efficiency of hydrogen separation. Another advantage is that the porous support body 221 enhances the strength of the separation layer 220. The thin film of the separating metal alone may, however, replace this structure of the separation layer 220 according to the requirements.

Figure 5:
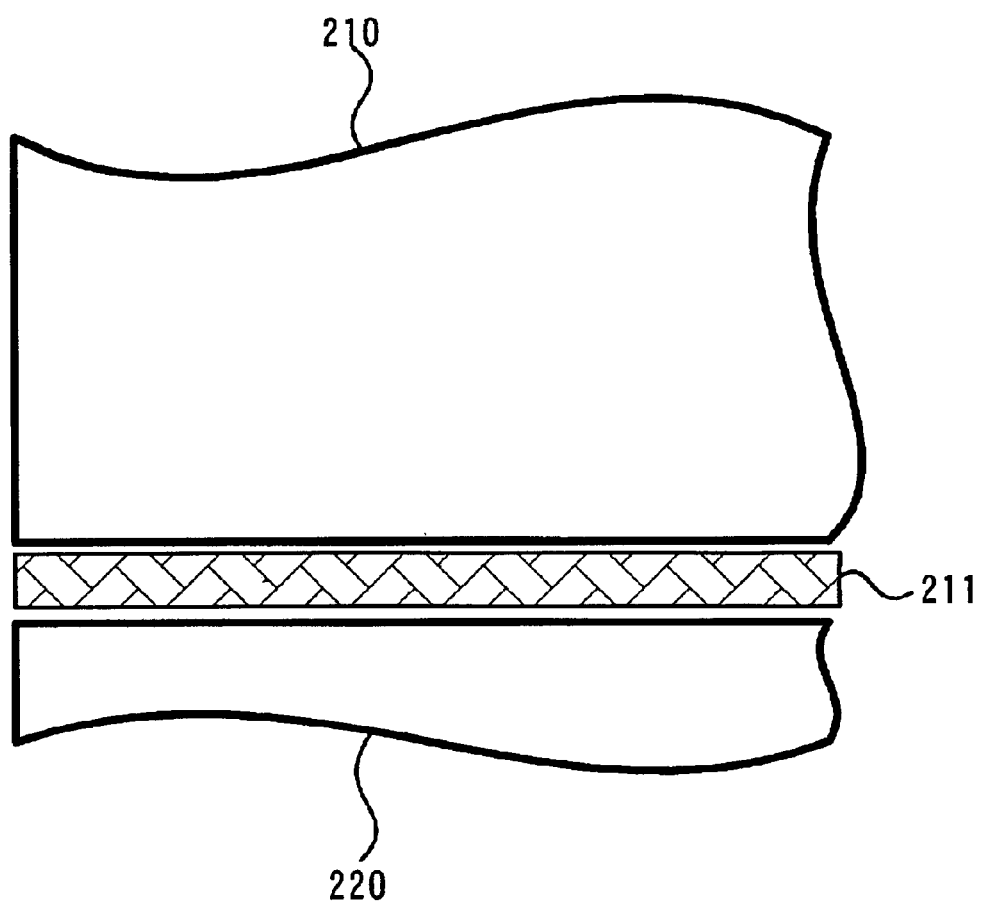
FIG. 5 is an enlarged sectional view illustrating the joint of the separation layer 220 with an extraction layer 210.

FIG. 5 is an enlarged sectional view illustrating the joint of the separation layer 220 with the extraction layer 210. The separation layer 220 is joined with the extraction layer 210 via a cushioning member 211. The cushioning member 211 may be, for example, carbon cloth, carbon paper, or glass wool. The cushioning member 211 prevents the separation layer 220 from being in direct contact with the porous extraction layer 210. This arrangement advantageously protects the separation layer 220 from damages due to friction of the separation layer 220 against the extraction layer 210. The cushioning member 211 is also interposed between the reformed gas layer 230 and the separation layer 220.

Figure 6:
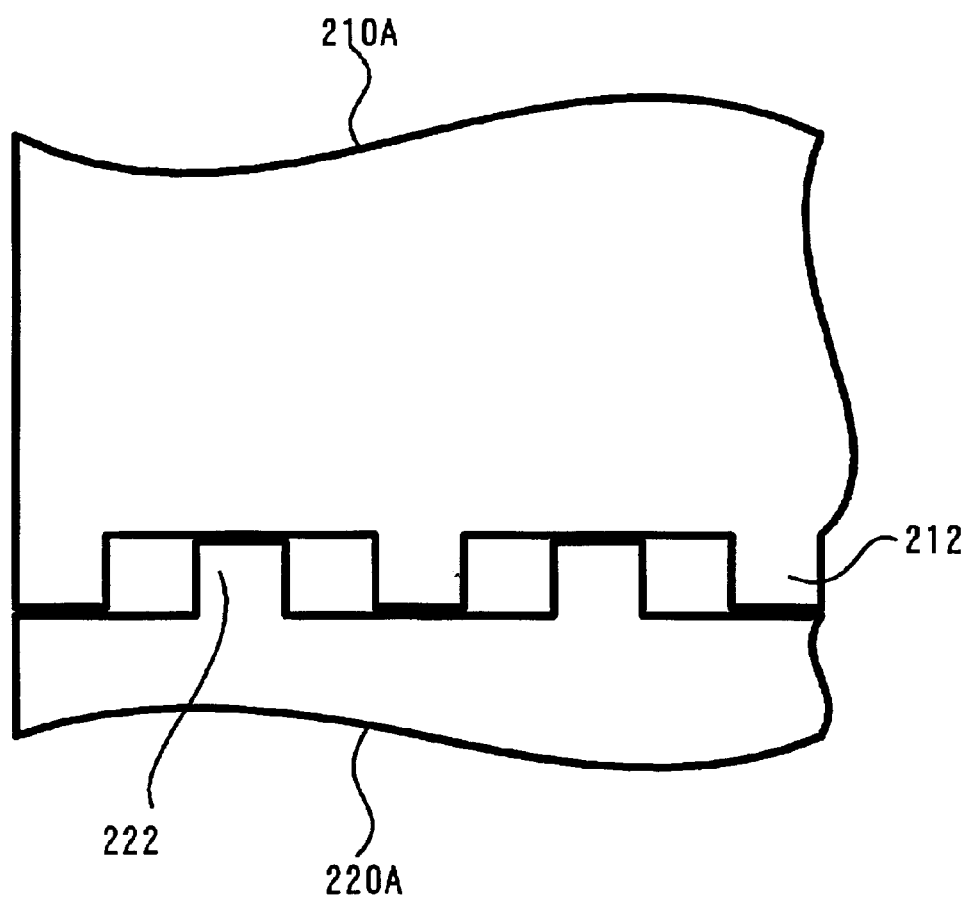
FIG. 6 is an enlarged sectional view illustrating the joint of a separation layer 220A with an extraction layer 210A in one modified example.

Another configuration may be adopted to protect the separation layer. FIG. 6 is an enlarged sectional view illustrating the joint of a separation layer 220A with an extraction layer 210A in one modified example. In this modified structure, the extraction layer 210A and the separation layer 220A respectively have projections 212 and 222. The function of the projections 212 and 222 prevents the whole surface of the separation layer 220A from being in direct contact with the extraction layer 210A. This arrangement restricts the areas of the separation layer 220A that are subject to possible damages and thus protects the separation layer 220A from damages to some extent. The structure with the projections 212 and 222 is preferably applied for the area having relatively little contribution to the hydrogen separation property, for example, on the periphery of each layer.

Figure 7:
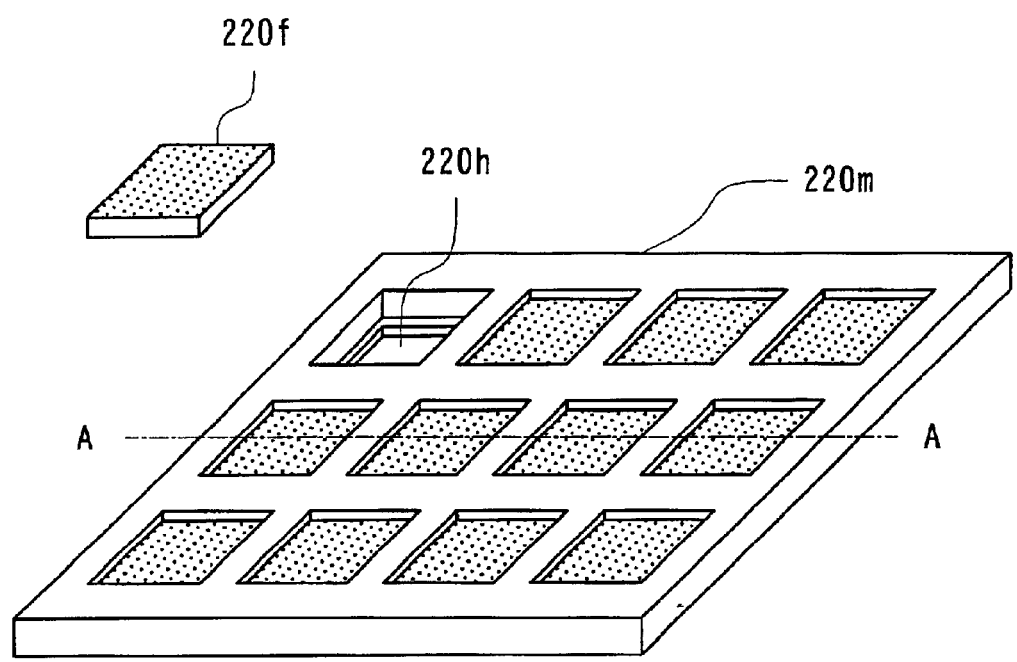
FIG. 7A and 7B show another structure of the separation layer in another modified example.
Figure 7B:
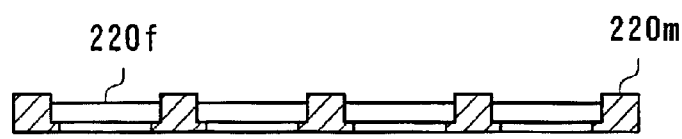

Still another configuration may be adopted to protect the separation layer. FIGS. 7A and 7B show another structure of the separation layer in another modified example. The separation layer of this modified example is manufactured by fitting a plurality of separation film plates 220f in a plurality of holes 220h formed in a metal frame 220m having the same size as that of the reformed gas layer 230 and the extraction layer 210. Each separation film plate 220f has the structure identical with that of the separation layer 220 discussed above with FIG. 4. The separation film plate 220f of the separation layer has a less thickness than the metal frame 220m. The metal frame 220m is processed, such that the surface of each separation film plate 220*f* fitted in the corresponding hole 220*h* is concaved from the surface of the metal frame 220*m* as shown in FIG. 7B.

The separation layer formed by fitting the plurality of separation film plates 220*f* having the small area in the metal frame 220*m* has the enhanced strength. The enhanced strength of the separation layer enables reduction of the thickness of the separation film plates 220*f*, thus reducing the size of the whole hydrogen separation mechanism and improving the rate of hydrogen transmission. In the actual use, the plurality of separation film plates 220*f* favorably disperse the thermal stress and thus effectively protect the separation layer from damages.

From the viewpoint of the homogeneous distribution of the hydrogen separation property, the manufacture of a large-area separation film plate is more difficult than the manufacture of the small-area separation film plates 220*f* and has a lower yield. The high yield of the small-area separation film plates 220*f* enhances the yield in the manufacture of the separation layer. The separation film plates 220*f* have the rectangular shape, but may have another polygonal shape or even a circular shape.

Figure 8:
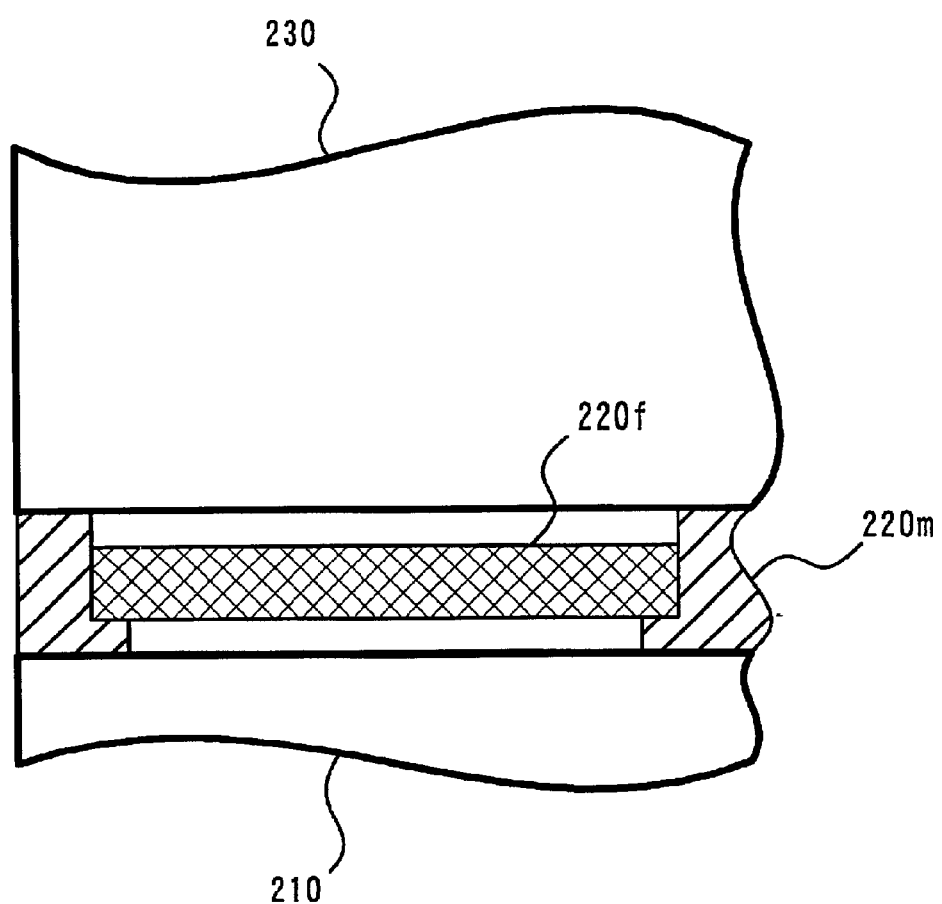
FIG. 8 is an enlarged sectional view illustrating the joint of the separation layer shown in FIG. 7A and 7B with the extraction layer 210 and the reformed gas layer 230.

FIG. 8 is an enlarged sectional view illustrating the joint of the separation layer with the extraction layer 210 and the reformed gas layer 230. This arrangement effectively prevents the separation film plates 220*f* from being in direct contact with the extraction layer 220 or the reformed gas layer 230 and protects the separation film plates 220*f* from damages. A dense ceramic frame may replace the metal frame 220*m*.

The hydrogen separation mechanism of the first embodiment discussed above has the laminate structure to reduce the size and the manufacturing cost. The porous composition of the respective layers enhances the strength of the hydrogen separation filter 200. The diversity of functions attained by the structure of the first embodiment ensure the efficient separation of hydrogen as discussed previously.

B. Modifications of First Embodiment

Figure 9:
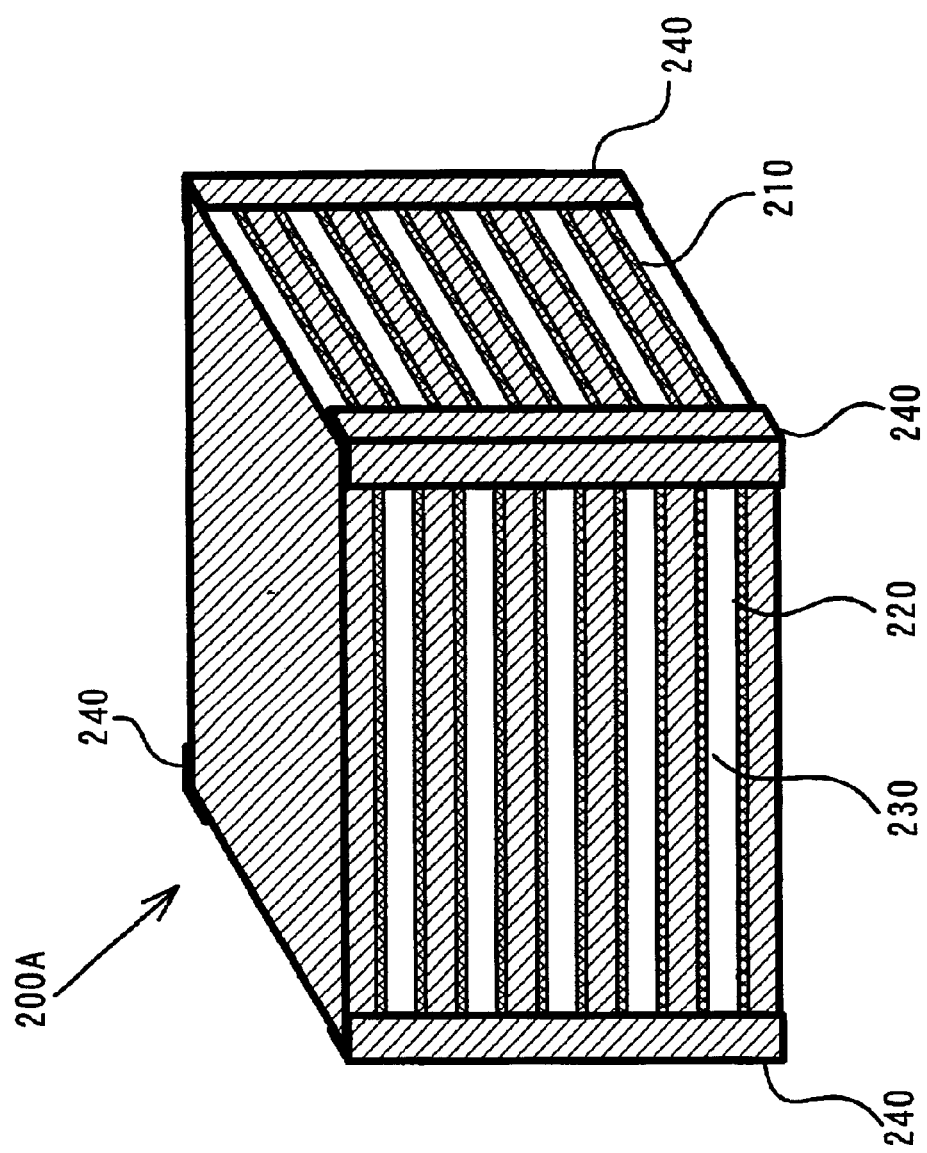
FIG. 9 is a perspective view illustrating another hydrogen separation filter 200A in one modification of the first embodiment.

FIG. 9 is a perspective view illustrating another hydrogen separation filter 200A in one modification of the first embodiment. The difference from the hydrogen separation filter 200 of the first embodiment is that the hydrogen separation filter 200A has seals 240 at four corners of the laminate structure. The seals 240 may be composed of, for example, alumina or glass. The other structure of the hydrogen separation filter 200A is identical with that of the hydrogen separation filter 200 of the first embodiment.

The arrangement of sealing only the side faces of the respective layers often makes the four corners of the laminate structure free of sealing and may cause leakage of the gas. The structure of attaching the seals 240 at the four corners in the modified example more securely prevents such leakage of the gas and thus enhances the reliability of the hydrogen separation mechanism.

Figure 10A:
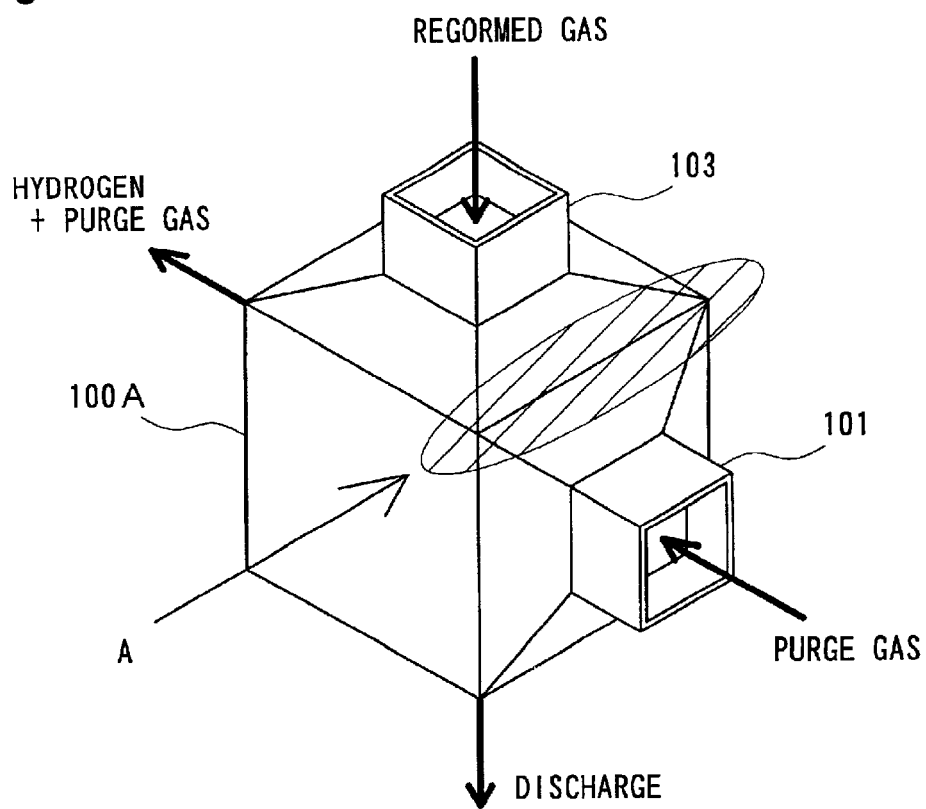
FIG. 10A and 10B show the structure of a gas leakage prevention mechanism between manifolds.
Figure 10B:
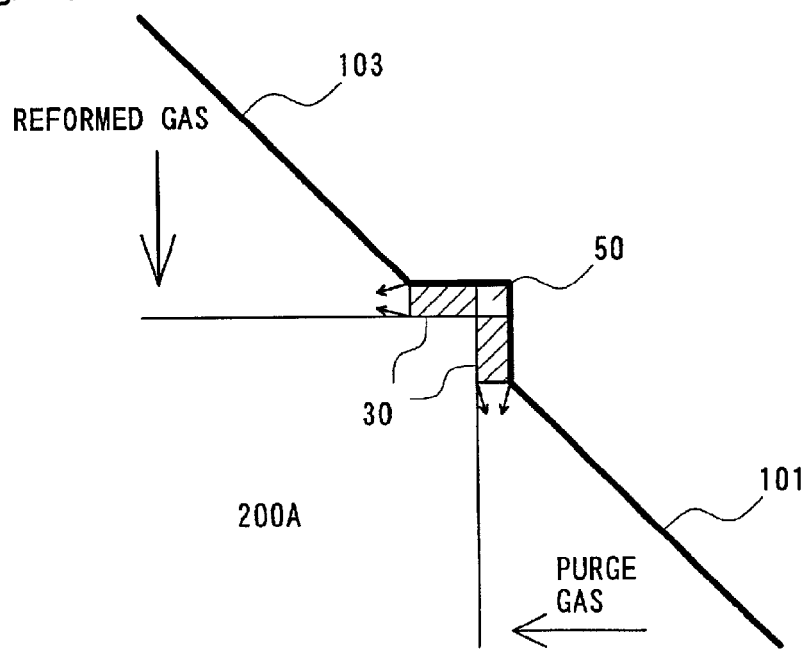

The following describes a gas leakage prevention mechanism between manifolds. FIG. 10A is a perspective view schematically illustrating the hydrogen separation mechanism with the gas leakage prevention mechanism between the manifolds. FIG. 10B is a sectional view showing the boundary between the reformed gas inlet and the purge gas inlet that is filled with slant lines and seen from the direction A in FIG. 10A. A gasket 30 for sealing is interposed between the sealed corner of the hydrogen separation filter 200A and the reformed gas inlet manifold 103 and the purge gas inlet manifold 101. The space defined by the gasket 0 and the manifolds 101 and 103 forms a steam supply conduit 50. A supply of steam having a little higher pressure than the reformed gas and the purge gas is flown through the steam supply conduit 50. In this embodiment, the pressure difference is approximately $9.8 \times 10^4$ Pa (1 kgf/cm$^2$). Even when there is any site of poor gas tightness between the gasket 30 and the manifolds 101 and 103 or between the gasket 30 and the hydrogen separation filter 200A, the pressure difference makes the steam leaked from the site to the reformed gas inlet or the purge gas inlet and effectively preventing the reformed gas from being mixed with the purge gas. This gas leakage prevention mechanism is applied for four corners of the hydrogen separation filter 200A.

Figure 11:
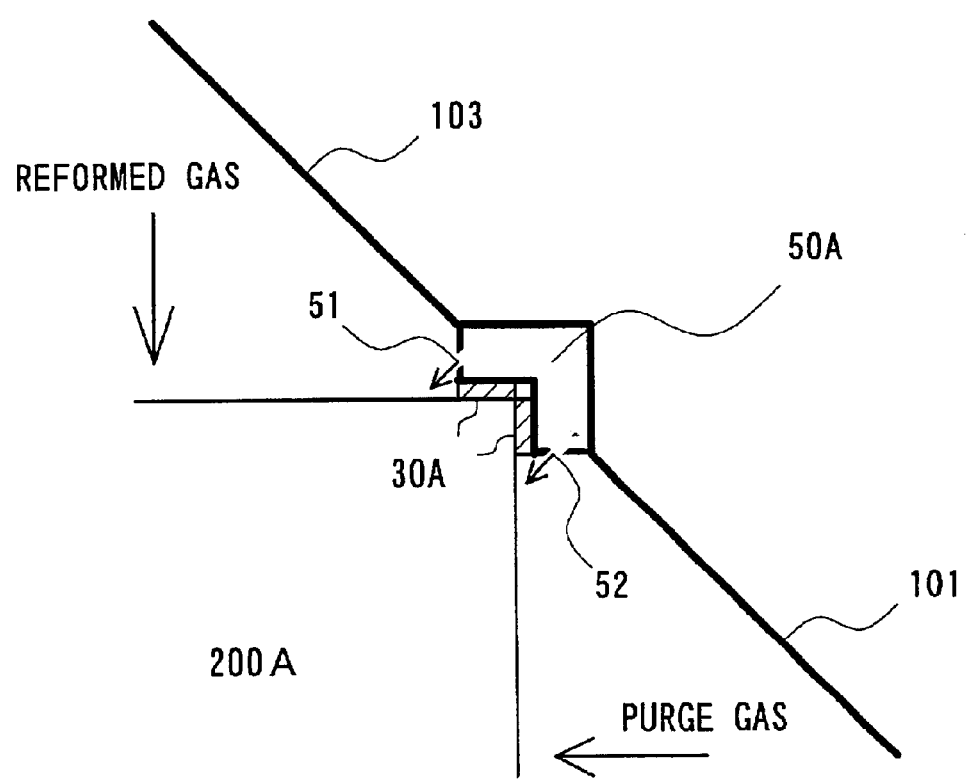
FIG. 11 shows one modified example of the gas leakage prevention mechanism between the manifolds.

FIG. 11 shows one modified example of the gas leakage prevention mechanism between the manifolds. In the gas leakage prevention mechanism shown in FIGS. 10A and 10B, the gasket 30 is interposed between the manifolds 101 and 103 and the hydrogen separation filter 200A to define the steam supply conduit 50. In the modified example, a steam supply conduit 50A is formed in advance integrally with the manifolds 101 and 103. The steam supply conduit 50A has a first steam supply groove 51, through which the supply of steam is flown to the reformed gas inlet, and a second steam supply groove 52, through which the supply of steam is flown to the purge gas inlet. In this structure, the supply of steam having the higher pressure than the reformed gas and the purge gas is actively flown to the reformed gas inlet and the purge gas inlet. This arrangement effectively prevents the reformed gas from being mixed with the purge gas.

C. Second Embodiment

Figure 12:
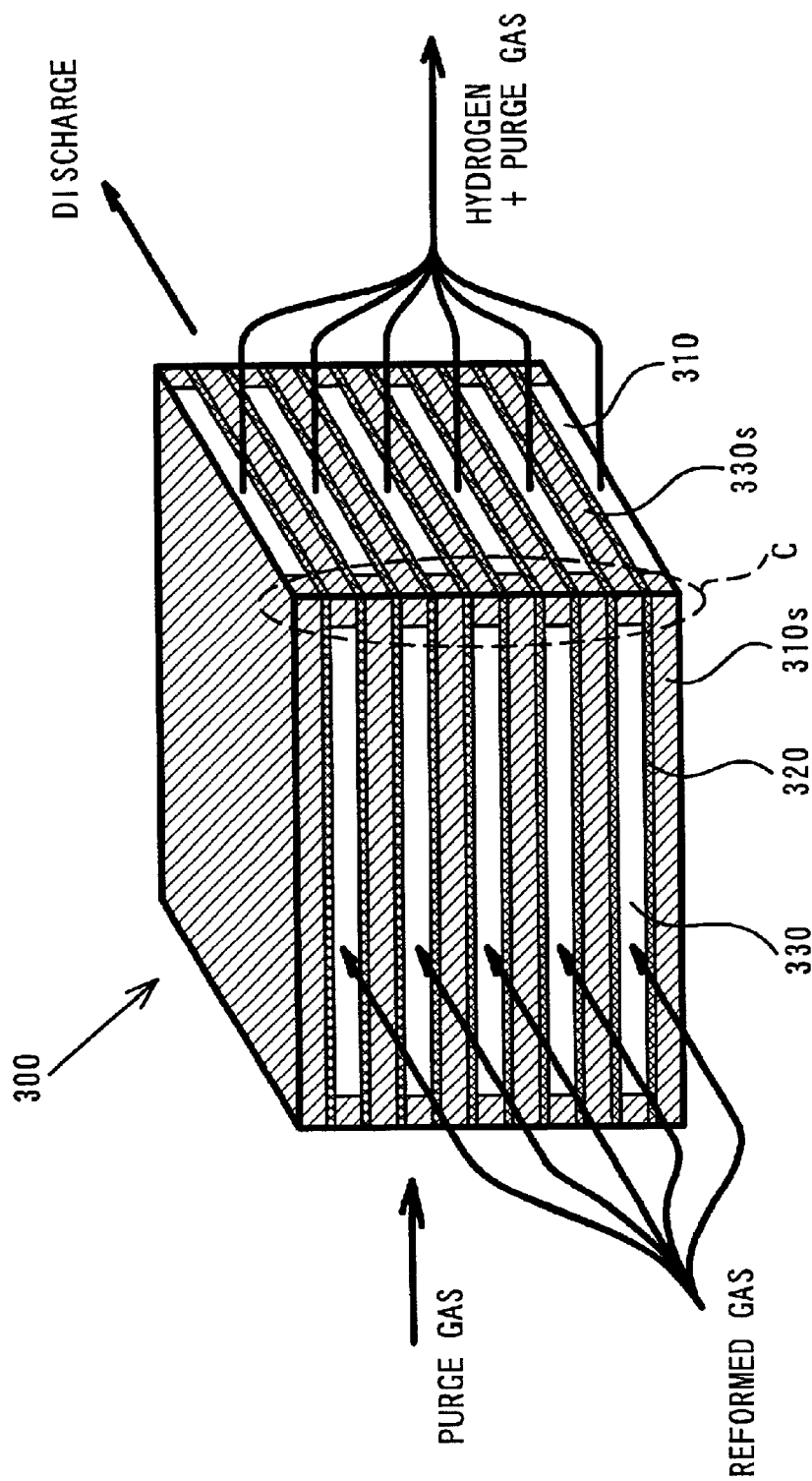
FIG. 12 is a perspective view schematically illustrating the structure of a hydrogen separation filter 300 in a second embodiment of the present invention.

FIG. 12 is a perspective view schematically illustrating the structure of a hydrogen separation filter 300 in a second embodiment of the present invention. Like the hydrogen separation filter 200 of the first embodiment, the hydrogen separation filter 300 is constructed by laying three different layers one upon another, that is, reformed gas layers 330, separation layers 320, and extraction layers 310. The directions of the gas flows in the structure of the second embodiment are also identical with those in the first embodiment. The difference from the first embodiment is the structure of sealing members 330*s* and 310*s* on the side faces of the reformed gas layers 330 and the extraction layers 310. The separation layers 320 have the identical structure with that of the separation layers 220 of the first embodiment.

Figure 13:
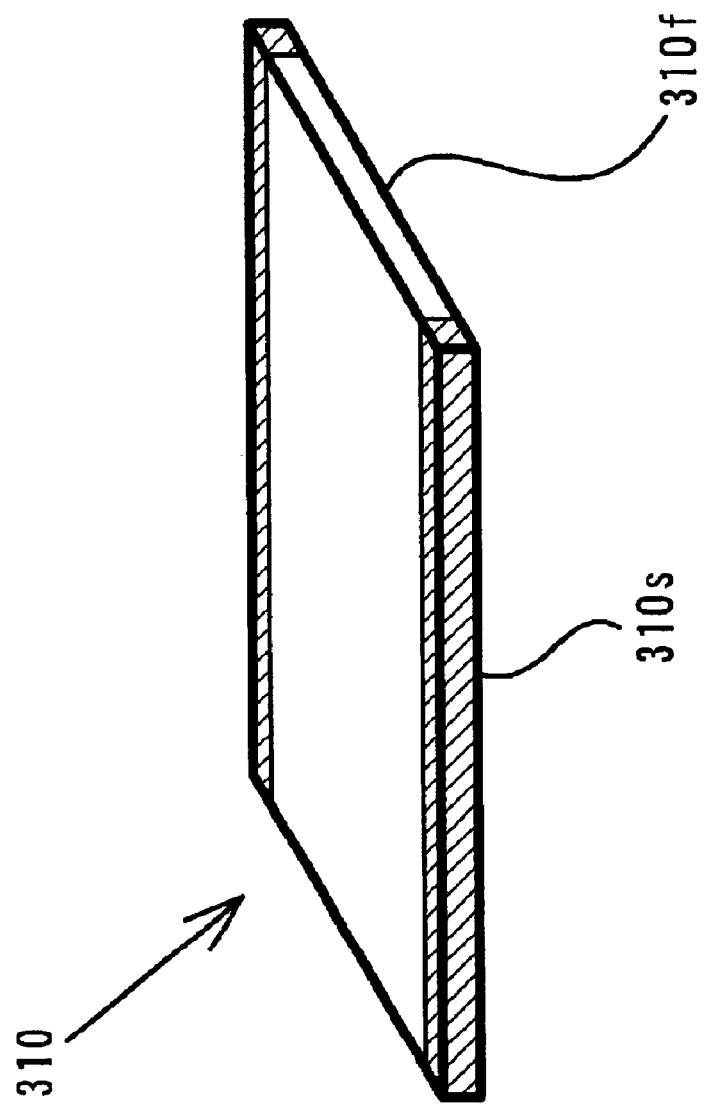
FIG. 13 is a perspective view schematically illustrating the structure of an extraction layer 310 in the second embodiment.

FIG. 13 is a perspective view schematically illustrating the structure of the extraction layer 310 in the second embodiment. The extraction layer 310 has a center member 310*f* composed of the porous material discussed in the first embodiment and the sealing members 310*s* arranged across the center member 310*f*. The hatched portions represent the sealing members 310*f*, which are composed of a gas-impermeable material, for example, a dense ceramic material. The purge gas and hydrogen flow in only the center member 310*f*. The reformed gas layer 330 has a similar structure.

The hydrogen separation filter 300 of the second embodiment has the enhanced sealing property on the side faces thereof, especially at the four corners of the laminate structure. As shown in an area C in FIG. 12, each of the four corners of the hydrogen separation filter 300 is covered with the laminate of the gas-impermeable material. This arrangement more securely prevents the gas leakage at the four corners of the laminate structure. The laminate structure of this arrangement exerts the similar effects to those of the seals 240 adopted in the modified example of the first embodiment (see FIG. 9), thus desirably reducing the manufacturing cost.

D. Modifications of Second Embodiment

The center member 310*f* of the extraction layer 310 may be omitted from the structure of the second embodiment. In this modified structure, the sealing members 310s are used as spacers to define a hollow gas conduit in the extraction layers 310. Similarly the reformed gas layers 330 may have a hollow gas conduit.

In the first and the second embodiments, a shift reaction catalyst or a carbon monoxide oxidation catalyst may be carried on the reformed gas layers. The shift reaction catalyst enables hydrogen to be produced from water and carbon monoxide included in the reformed gas in the reformed gas layers, thus enhancing the efficiency of hydrogen production. The oxidation catalyst reduces the concentration of carbon monoxide included in the reformed gas. Even when the separation layer has a pinhole, this arrangement depresses leakage of carbon monoxide to the extraction layers. In the case where the resulting hydrogen is supplied to fuel cells, this arrangement advantageously prevents the hydrogen rich gas from being contaminated with carbon monoxide, which adversely affects the electrodes in the fuel cells.

In the first and the second embodiments, a reforming catalyst may be carried on the reformed gas layers, and a crude material like methanol prior to the reforming reaction may be supplied to the hydrogen separation mechanism. The reforming catalyst enables hydrogen to be produced by reforming the crude material in the reformed gas layers and extracted in the extraction layers. This arrangement does not require a separate unit for the reforming reaction and thereby reduces the whole size of the hydrogen generator. Any combination of these catalysts discussed above may be carried on the reformed gas layers to accelerate the corresponding reactions simultaneously.

The respective layers may have uneven surface, though the respective layers are formed flat in the above embodiments and their modified examples. The uneven surface increases the practical surface area of each layer and thus enhances the efficiency of hydrogen separation.

E. Third Embodiment

The first and the second embodiments and their modified examples regard the structure of separating hydrogen by means of the hydrogen separation film. The hydrogen separation film is generally a thin film, so that there is a possibility that hydrogen is contaminated with carbon monoxide included in the reformed gas, due to the presence of a pinhole or a partial damage thereof. A third embodiment of the present invention regards the structure having a mechanism of relieving the adverse effects of contamination with carbon monoxide. This mechanism is actualized by filling the flow conduit of extracted hydrogen with a methanation catalyst of carbon monoxide.

The structure of a hydrogen generator in the third embodiment is substantially similar to that of the hydrogen generator of the first embodiment shown in FIG. 1. The laminate structure of a hydrogen separation filter is also similar to that of the hydrogen separation filter 200 of the first embodiment shown in FIG. 2. The difference from the first embodiment is the structure of the hydrogen separation layer.

Figure 14:
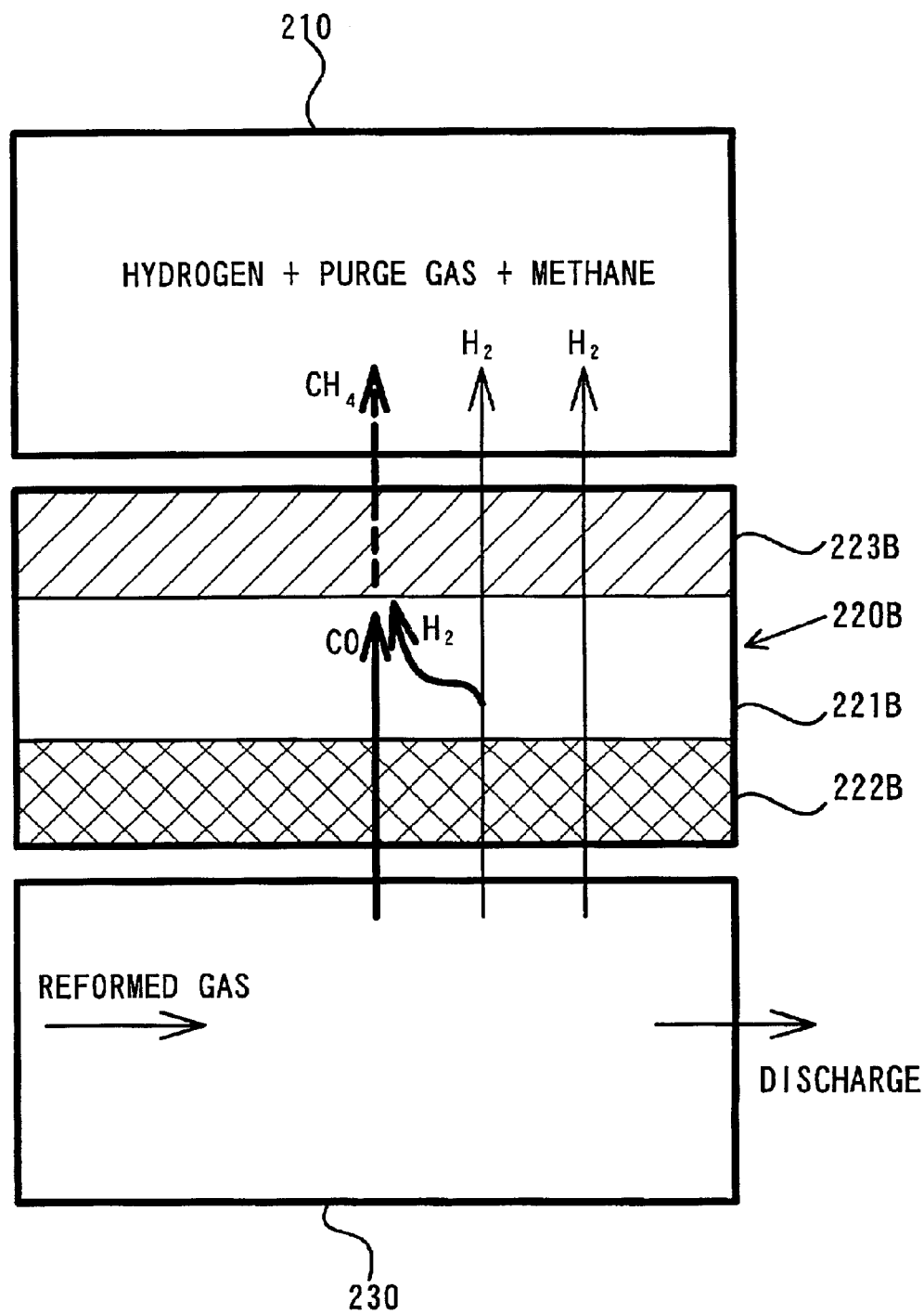
FIG. 14 is an enlarged view illustrating the structure of a hydrogen separation layer 220B in the third embodiment.

FIG. 14 is an enlarged view illustrating the structure of a hydrogen separation layer 220B in the third embodiment. The hydrogen separation layer 220B has a separating metal layer 222B obtained by filling pores of a porous support body 221B, such as a ceramic support body, with a separating metal that has hydrogen selective permeability. The structure of the separating metal layer 222B with the separating metal carried thereon is identical with the structure of the hydrogen separation layer 220 of the first embodiment shown in FIG. 4. The hydrogen separation layer 220B further includes a methanation catalyst layer 223B formed on the other face of the porous support body 221B to be opposite to the separating metal layer 222B. The methanation catalyst layer 223B is obtained by filling the pores of the porous support body 221B with a methanation catalyst of carbon monoxide. Nickel (Ni), ruthenium (Ru), or rhodium (Rh) may be used for the methanation catalyst.

A variety of methods may be applied to prepare the methanation catalyst layer 223B. The first applicable method coats the surface of the porous support body 221B with the methanation catalyst. The technique of gas phase vapor deposition, such as physical vapor deposition (PVD) or chemical vapor deposition (CVD), is applicable for coating. Slurry of alumina powder with the methanation catalyst carried thereon may be applied on the surface of the porous support body 221B. The plating technique is also applicable for coating.

The second applicable method causes the methanation catalyst to be directly carried on the porous support body 221B. In the case where the porous support body 221B is made of a ceramic material, the methanation catalyst may directly be packed in the pores of the ceramic support body 221B. This method does not require the process of making the catalyst carried, for example, on alumina powder and thus advantageously simplifies the procedures of the preparation. The variety of methods discussed previously with regard to the structure of the separation layer 220 (see FIG. 4) are applicable to make the methanation catalyst directly carried on the porous support body 221B. In the case where the porous support body 221B is made of a metal material like metal celmet, in order to prevent the methanation catalyst from being combined with the metal support body to form an alloy, the desirable method causes the methanation catalyst to be carried on the metal support body coated with alumina or another ceramic powder or coats the metal support body with alumina or another ceramic powder having the methanation catalyst carried thereon.

The hydrogen separation layer 220B is interposed between the reformed gas layer 230 and the extraction layer 210 in the laminate structure as shown in FIG. 14. Hydrogen in the supply of the reformed gas fed to the reformed gas layer 230 is extracted to the extraction layer 210 by the function of the separating metal layer 222B. The methanation catalyst layer 223B is arranged after the separating metal layer 222B along the flow path. Carbon monoxide, which passes through the separating metal layer 222B due to a pinhole or a local damage thereof, is subjected to methanation by the function of the methanation catalyst layer 2223B. Part of the hydrogen transmitted through the separating metal layer 222B is used for the methanation. This arrangement does not require any additional mechanism for separately supplying a specific gas used for the methanation to the methanation catalyst layer 223B.

As is known in the art, the methanation proceeds at temperatures of not lower than 140° C. The reforming reaction generally proceeds at temperatures of 300 to 800° C. according to the crude material. The reformed gas accordingly has the temperature higher than the methanation temperature. In the structure of the third embodiment, the supply of the hot reformed gas desirably accelerates the methanation without any specific temperature regulation.

In the hydrogen generator of the third embodiment described above, the function of the methanation catalyst layer 223B effectively prevents the resulting hydrogen from being contaminated with carbon monoxide. This arrangement desirably relieves the adverse effects of contamination with the harmful component, carbon monoxide. Especially when the resulting hydrogen is supplied to the fuel cells, this arrangement effectively prevents the electrodes of the fuel cells from being poisoned.

In the structure of the third embodiment, the methanation proceeds by the function of the methanation catalyst layer 223B. This arrangement does not require any specific means for temperature regulation or supply of a specific gas, thus desirably simplifying the structure of the whole hydrogen generator.

F. Modifications of Third Embodiment

Figure 15:
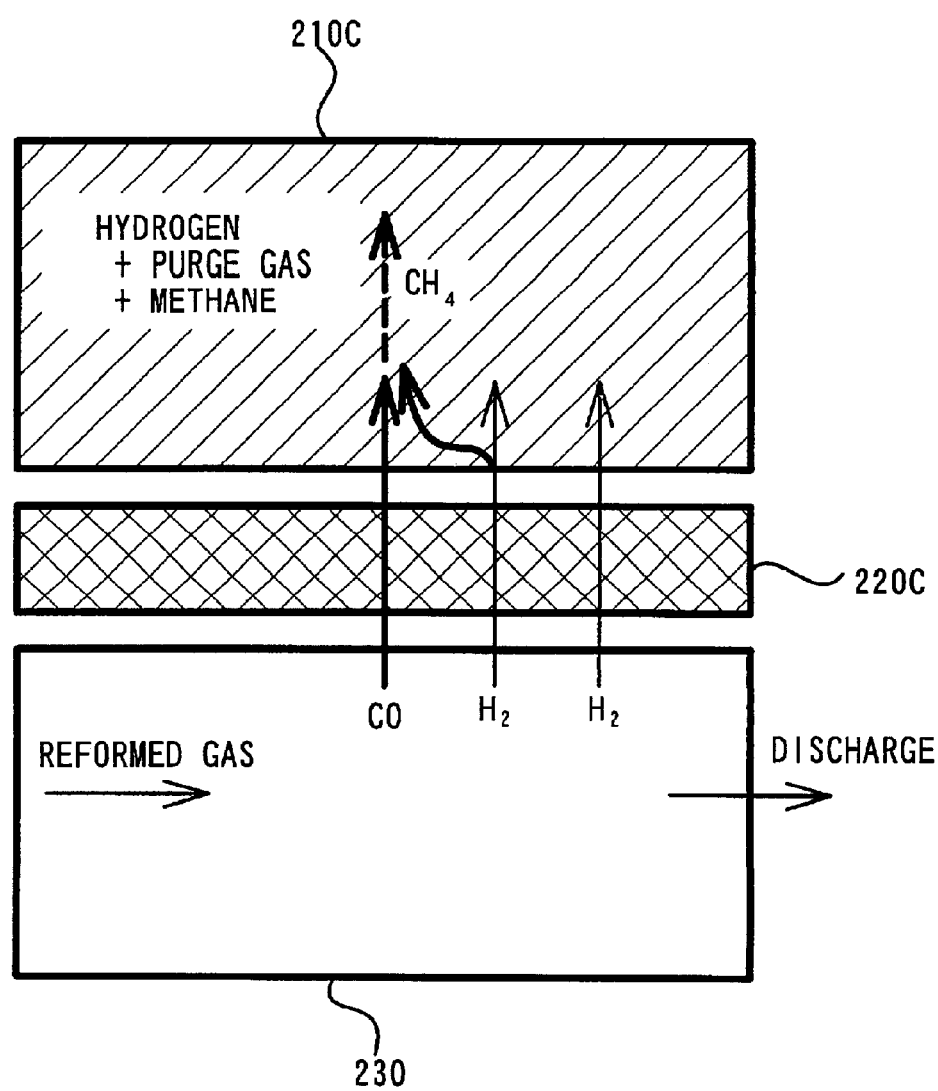
FIG. 15 is an enlarged view schematically illustrating the structure of a hydrogen separation layer 220C in one modification of the third embodiment.

FIG. 15 is an enlarged view schematically illustrating the structure of a hydrogen separation layer 220C in one modification of the third embodiment. In this modified structure, the methanation catalyst is carried on a hydrogen extraction layer 210C. This corresponds to the structure of integrating the methanation catalyst layer with the hydrogen extraction layer. The hydrogen separation layer 220C may have the structure of the first embodiment shown in FIG. 4 or any other appropriate structure. For example, the hydrogen separation layer 220C may be a palladium or palladium-silver alloy layer, a ceramic or another porous support body coated with either palladium or palladium-silver alloy, or a ceramic, resin, or another porous separation film.

The methanation catalyst is carried on the hydrogen extraction layer 210C. In the case where the hydrogen extraction layer 210C is composed of a porous body like a ceramic body, the pores of the porous body are filled with the methanation catalyst. Any of the various methods discussed previously with regard to the structure of the separation layer 220 (see FIG. 4) is applicable to make the methanation catalyst carried on the hydrogen extraction layer 210C. When the hydrogen extraction layer 210C has a hollow as in the modified structure of the second embodiment, the hollow is filled with pellets of the methanation catalyst.

The arrangement of making the methanation catalyst carried on the hydrogen extraction layer 210C effectively relieves the adverse effects of contamination of the transmitted hydrogen with carbon monoxide. As in the case of the third embodiment, this arrangement does not require any specific means for temperature regulation or supply of a specific gas for the progress of the methanation.

G. Fourth Embodiment

In the first through the third embodiments, the reformed gas and the purge gas are respectively flown in parallel through the plurality of reformed gas layers and the plurality of extraction layers included in the hydrogen separation filter. Namely each gas passes through the shortest path of each layer. The flow path length of the gas accordingly corresponds to the length of one side of each layer.

Figure 16A:
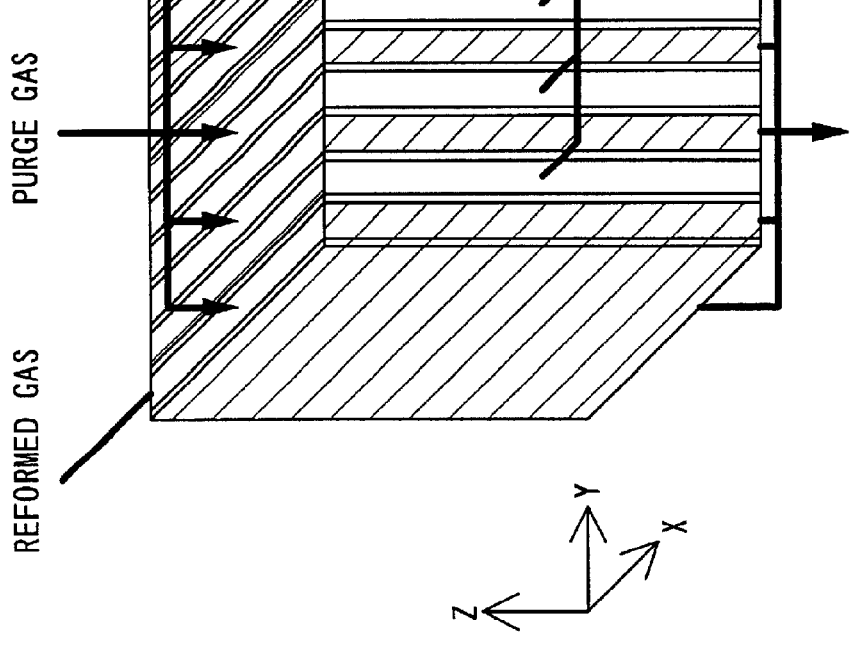
FIG. 16A and 16B show a distribution of the hydrogen partial pressure difference between the reformed gas layer and the extraction layer when the reformed gas and the purge gas are respectively flown in parallel.
Figure 16B:
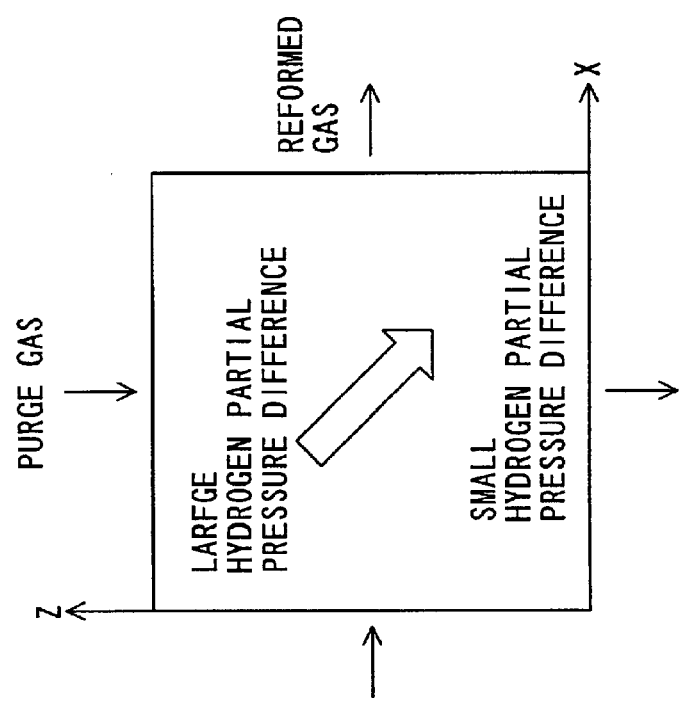

FIG. 16B shows a distribution of the hydrogen partial pressure difference between the reformed gas layer and the extraction layer when the reformed gas and the purge gas are respectively flown in parallel. In the reformed gas layer, hydrogen is extracted along a path from the inlet to the outlet of the reformed gas, so that the hydrogen partial pressure gradually decreases along the path. In the extraction layer, on the contrary, the hydrogen partial pressure gradually increases along a path from the inlet to the outlet of the purge gas. A site in the neighborhood of the inlets of the reformed gas and the purge gas accordingly has a large hydrogen partial pressure difference, whereas a site in the neighborhood of the outlets of the reformed gas and the purge gas has a small hydrogen partial pressure difference as shown in FIG. 16B.

Figure 17:
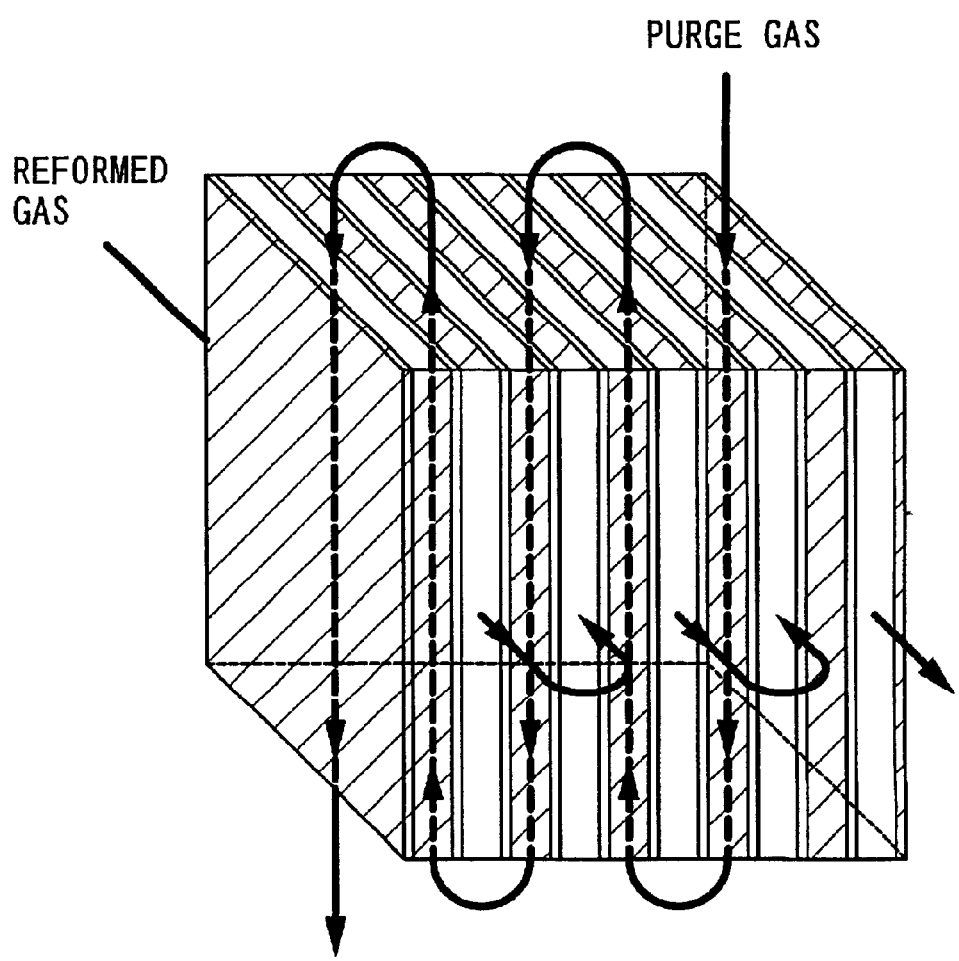
FIG. 17 shows a first method of gas flow in the fourth embodiment.

In the structure of the fourth embodiment, the reformed gas and the purge gas are flown through the respective layers in a different manner from that of the first embodiment. FIG. 17 shows a first method of gas flow in the fourth embodiment. In this example, the reformed gas and the purge gas are successively flown through the plurality of reformed gas layers and the plurality of extraction layers in series, respectively. This arrangement extends the flow path of the reformed gas. The flow of the gas successively passing through the plurality of reformed gas layers in series is opposed to the flow of the gas passing through the plurality of extraction layers in series. The opposed flows practically average the distribution of the hydrogen partial pressure difference. When there is a small hydrogen partial pressure difference between a certain extraction layer and one adjoining reformed gas layer via a hydrogen separation layer, the hydrogen partial pressure difference is large between the certain extraction layer and the other adjoining reformed gas layer via another hydrogen separation layer. This enables hydrogen to be extracted from either one of the adjoining reformed gas layers, thus increasing the quantity of hydrogen extracted from the reformed gas.

Figure 18:
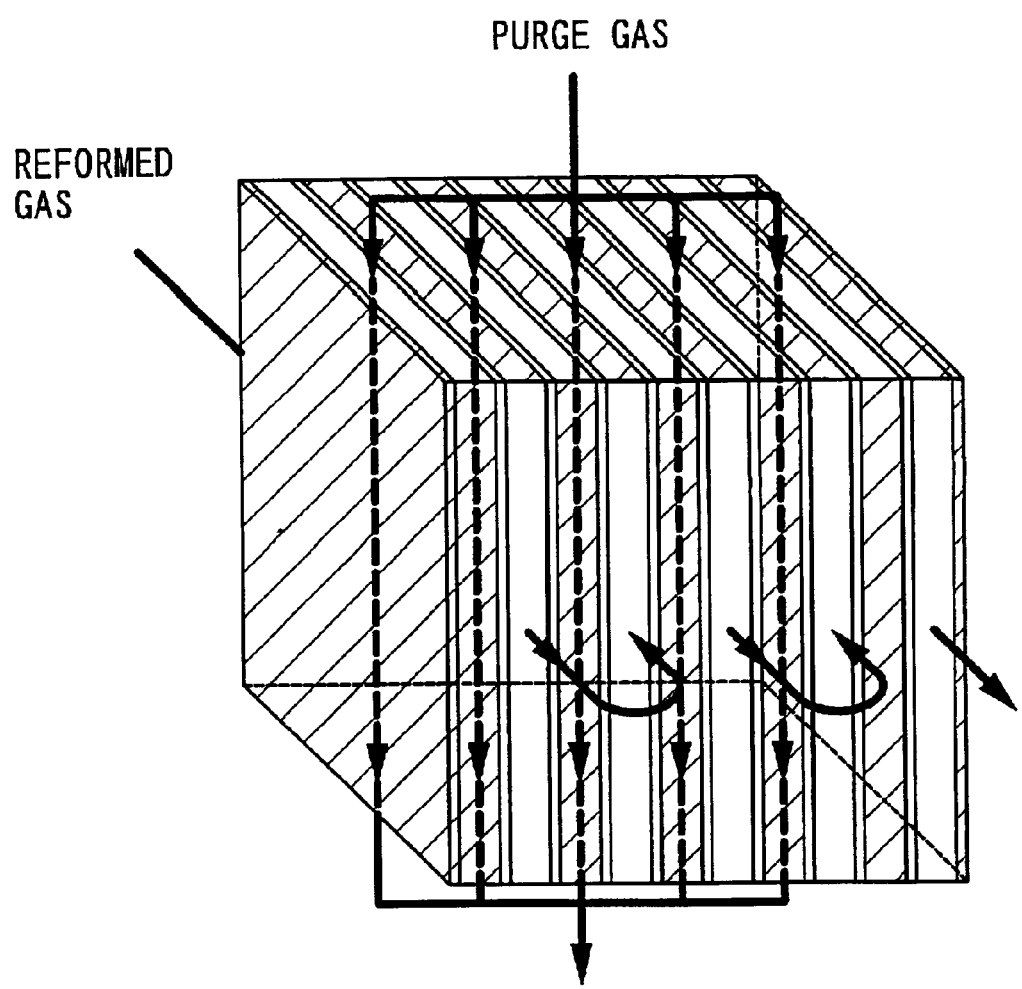
FIG. 18 shows a second method of gas flow in the fourth embodiment.

FIG. 18 shows a second method of gas flow in the fourth embodiment. In this example, the flow of the reformed gas successively passes through the plurality of reformed gas layers in series, whereas the flow of the purge gas passes through the plurality of extraction layers in parallel. This arrangement also increases the quantity of hydrogen extracted from the reformed gas.

H. Modifications of Fourth Embodiment

Figure 19A:
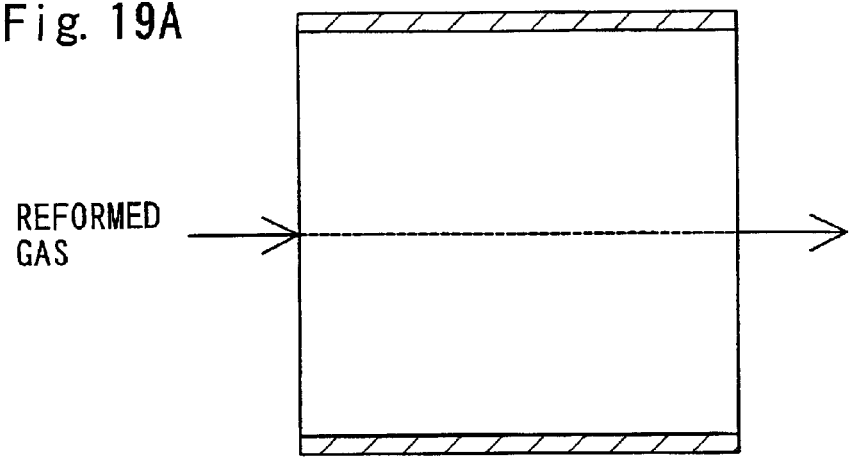
FIG. 19A, 19B, and 19C show the method of gas flow in one modification of the fourth embodiment.
Figure 19B:
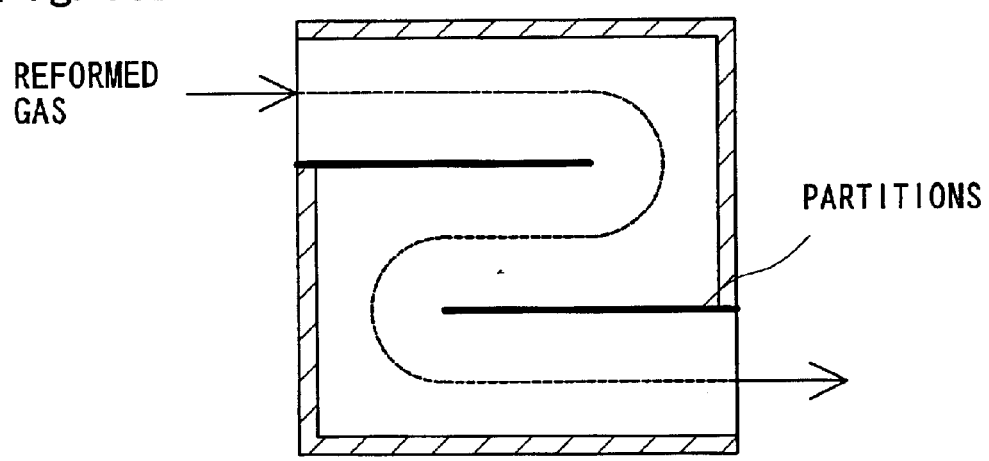
Figure 19C:
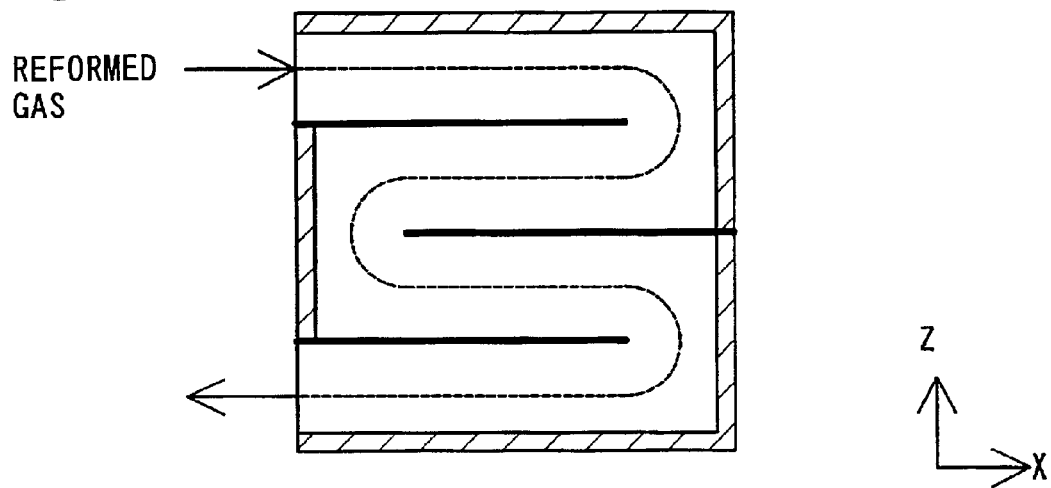

The structure of the fourth embodiment makes the gas flow through the plurality of layers in series, so as to extend the gas flow path and substantially average the hydrogen partial pressure difference. One modified structure extends the gas flow path in one layer. FIG. 19A, 19B and 19C show the method of gas flow in one modification of the fourth embodiment. As shown in FIGS. 19B and 19C, in this example, partitions are disposed in one reformed gas layer to make the reformed gas flow in the reformed gas layer in a serpentine manner. The circumferential part of the reformed gas layers is appropriately sealed (the hatched portions) to give a desired flow path. This arrangement increases the quantity of hydrogen transmission. The modified structure is also applicable for the extraction layer. As shown in FIG. 19C, an odd number of partitions causes the gas inlet and the gas outlet to be located on the same side. This structure attains the compact layout of gas piping and desirably reduces the whole size of the hydrogen generator.

In the fourth embodiment and its modified structure, the gas is successively flown through the plurality of layers in series or is flown in one layer in a serpentine manner. This extends the gas flow path and increases the quantity of hydrogen extraction. Such arrangement may be included in part of the laminate structure of the hydrogen separation filter.

In any of the embodiments and their modifications discussed above, it is desirable to supply the gas to each layer at a constant flow rate when the gas is supplied to a plurality of layers in parallel. The following describes the means for supplying the gas to the plurality of layers at a substantially constant flow rate. FIGS. 20 and 21 show possible mechanisms of supplying the gas to the plurality of layers at a substantially constant flow rate. The respective drawings are the sectional views showing the laminate section including the reformed gas layers 230, the separation layers 220, and the extraction layers 210 with the manifold section and the casing 100. FIGS. 20B, 20C, and 20D show only the manifold section, and the laminate section including the reformed gas layers 230, the separation layers 220, and the extraction layers 210 is omitted from the illustration.

Figure 20A:
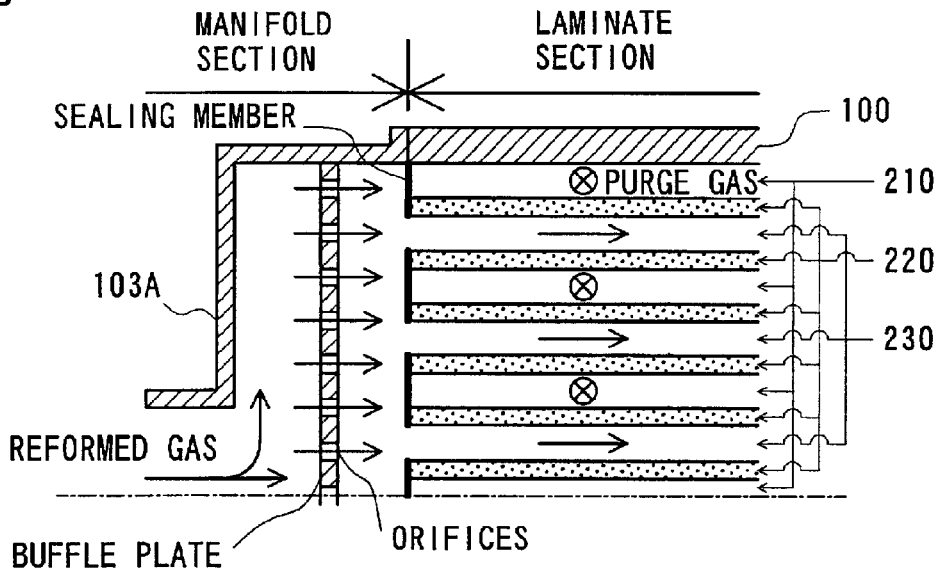
FIG. 20A through 20D show possible mechanisms of supplying the gas to the plurality of layers at a substantially constant flow rate.
Figure 20B:
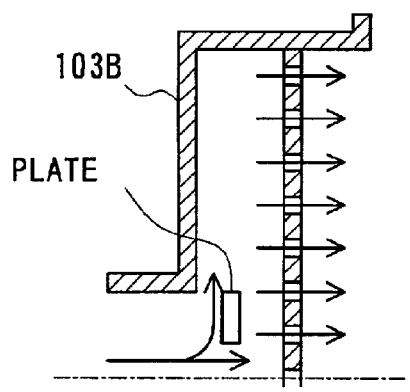
Figure 20C:
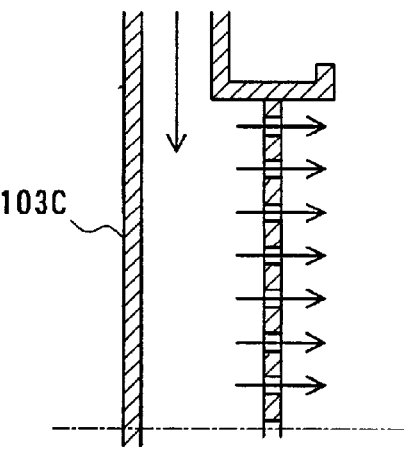
Figure 20D:
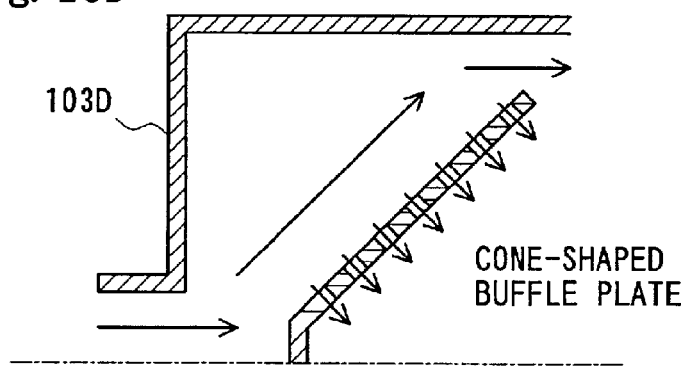

The example of FIG. 20A uses a manifold 103A in which a baffle plate with orifices is located. The gas flow rate is regulated by appropriately setting the diameters of the orifices. The orifice farther from the gas inlet of the manifold 103A is set to have the greater diameter. This arrangement enables the reformed gas to be supplied to the respective reformed gas layers 230 at a substantially constant flow rate.

The example of FIG. 20B uses a manifold 103B in which another plate is located before the baffle plate of FIG. 20A along the flow path. This arrangement further equalizes the flow rate of the reformed gas supplied to the respective reformed gas layers 230.

The example of FIG. 20C uses a manifold 103C in which the feeding direction of the reformed gas is made in parallel with a baffle plate. This arrangement also enables the reformed gas to be supplied to the respective reformed gas layers 230 at a substantially constant flow rate.

The example of FIG. 20D uses a manifold 103D in which a cone-shaped baffle plate is located. The arrangement of fixing the diameter of the orifices and appropriately setting the angle of the baffle plate enables the reformed gas to be supplied to the respective reformed gas layers 230 at a substantially constant flow rate.

Figure 21A:
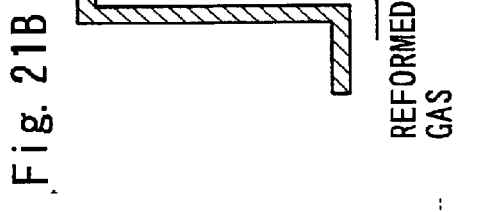
FIG. 21A through 21D show possible mechanisms of supplying the gas to the plurality of layers at a substantially constant flow rate.

The example of FIG. 21A provides nozzles in the manifold, from which the reformed gas is ejected. This arrangement ensures the homogeneous dispersion of the reformed gas over the whole area of the manifold and thus enables the reformed gas to be supplied to the respective reformed gas layers at a substantially constant flow rate.

Figure 21B:
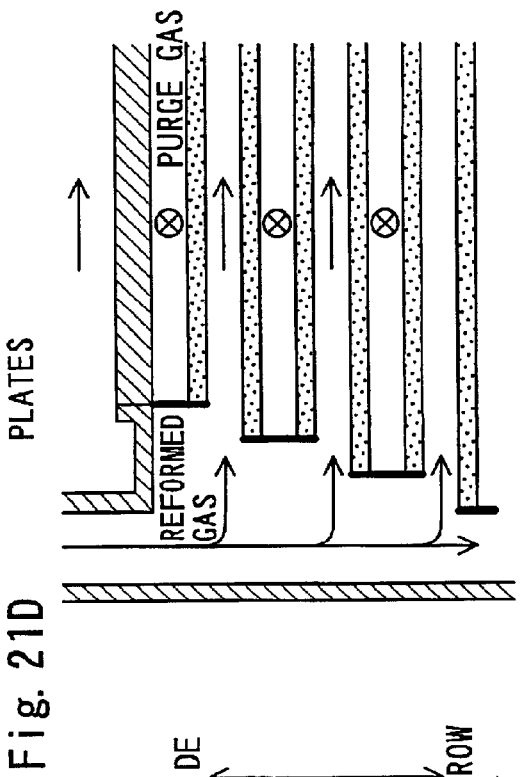

The example of FIG. 21B provides rectifying plates in the manifold. This arrangement rectifies the flow of the reformed gas and thus enables the reformed gas to be supplied to the respective reformed gas layers at a substantially constant flow rate.

Figure 21C:
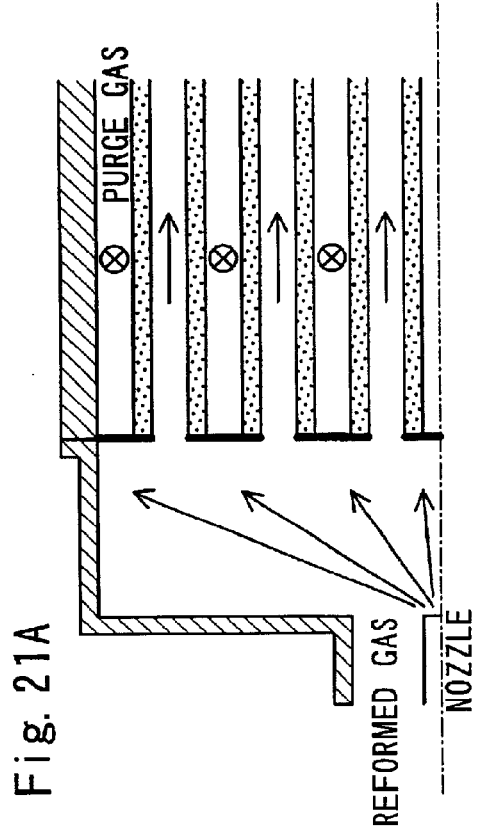

The example of FIG. 21C varies the thickness of the reformed gas layer according to the distance from the gas inlet of the manifold. In other words, the settings vary the cross section of the flow path of the reformed gas. This gives a difference in pressure loss and thus enables the reformed gas to be supplied to the respective reformed gas layers at a substantially constant flow rate.

Figure 21D:
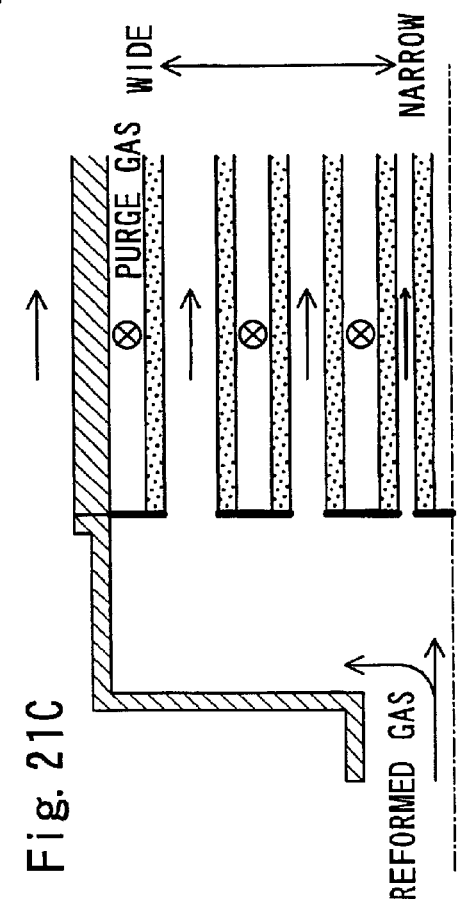

The example of FIG. 21D makes the feeding direction of the reformed gas perpendicular to the reformed gas layers and tapers the manifold with an increase in distance from the reformed gas inlet of the manifold. This arrangement enables the reformed gas to be supplied to the respective reformed gas layers at a substantially constant flow rate.

I. Fifth Embodiment

Figure 22:
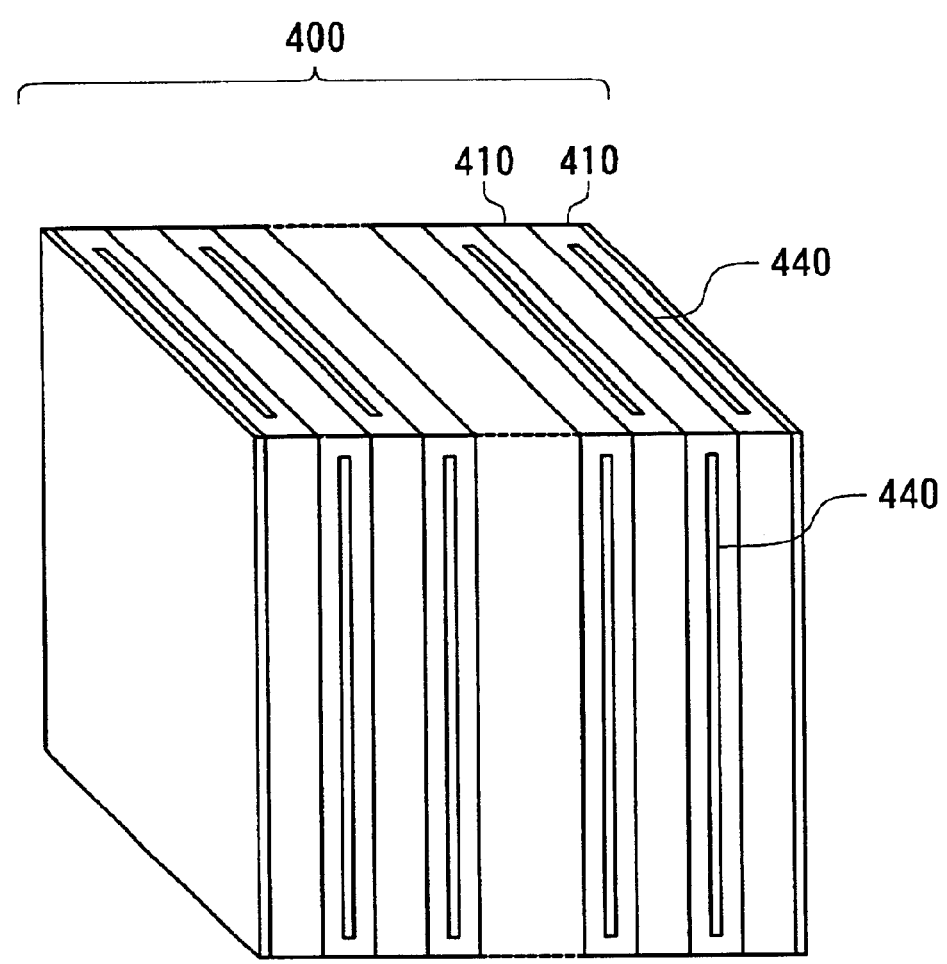
FIG. 22 is a perspective view illustrating a hydrogen separation filter 400 in a fifth embodiment of the present invention.
Figure 23:
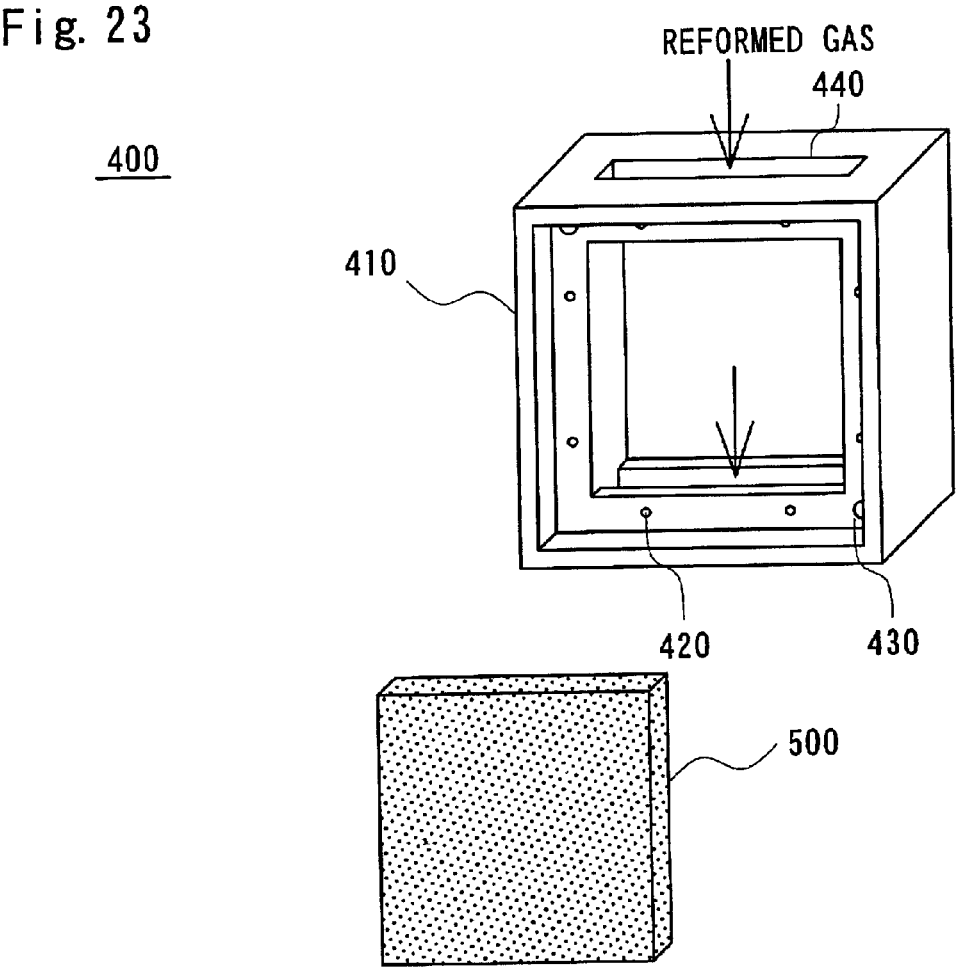
FIG. 23 is a decomposed perspective view showing the hydrogen separation filter 400 of the fifth embodiment.
Figure 23:
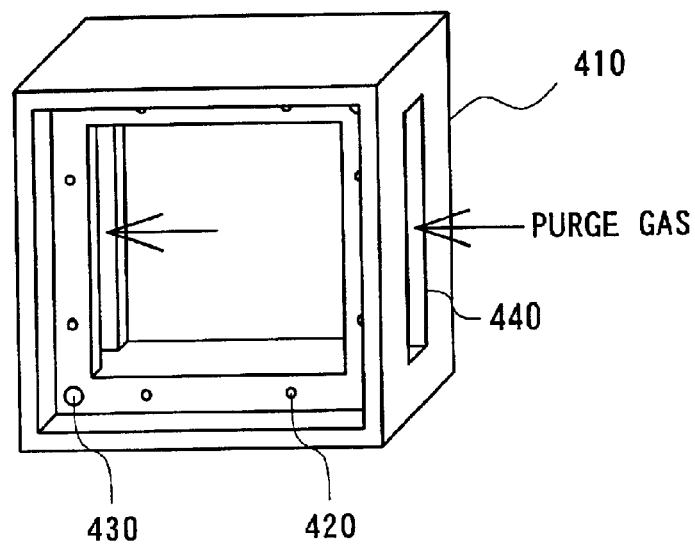

FIG. 22 is a perspective view illustrating a hydrogen separation filter 400 in a fifth embodiment of the present invention. FIG. 23 is a decomposed perspective view showing the hydrogen separation filter 400 of the fifth embodiment. The hydrogen separation filter 400 is obtained by alternately laying square metal frames 410 and square separation films 500 one upon the other via gaskets (not shown). Both faces of the metal frame 410 are recessed by approximately half the thickness of the separation film 500, such that each metal frame 410 is in contact with adjoining metal frames 410 in the laminate structure where the metal frames 410 and the separation films 500 are alternately laid one upon the other. Projections 420 for positioning the separation film 500 are formed in the recess. Steam supply inlets 430, which are holes through the metal frame 410 and allow the flow of steam, are provided at diagonal positions of the recess. A gas supply inlet 440 for supplying the reformed gas or the purge gas to an area defined by the metal frame 410 and the separation film 500 and a gas discharge outlet 440 for discharging the reformed gas or the purge gas are formed in opposite side faces of the metal frame 410.

The area that is defined by the metal frame 410 and the separation film 500 and receives the flow of the reformed gas functions as the reformed gas layer. The area that is defined by the metal frame 410 and the separation film 500 and receives the flow of the purge gas functions as the extraction layer. The metal frames 410 are laid one upon another by alternately rotating 90 degrees, so that the flow direction of the reformed gas is made perpendicular to the flow direction of the purge gas.

Figure 24:
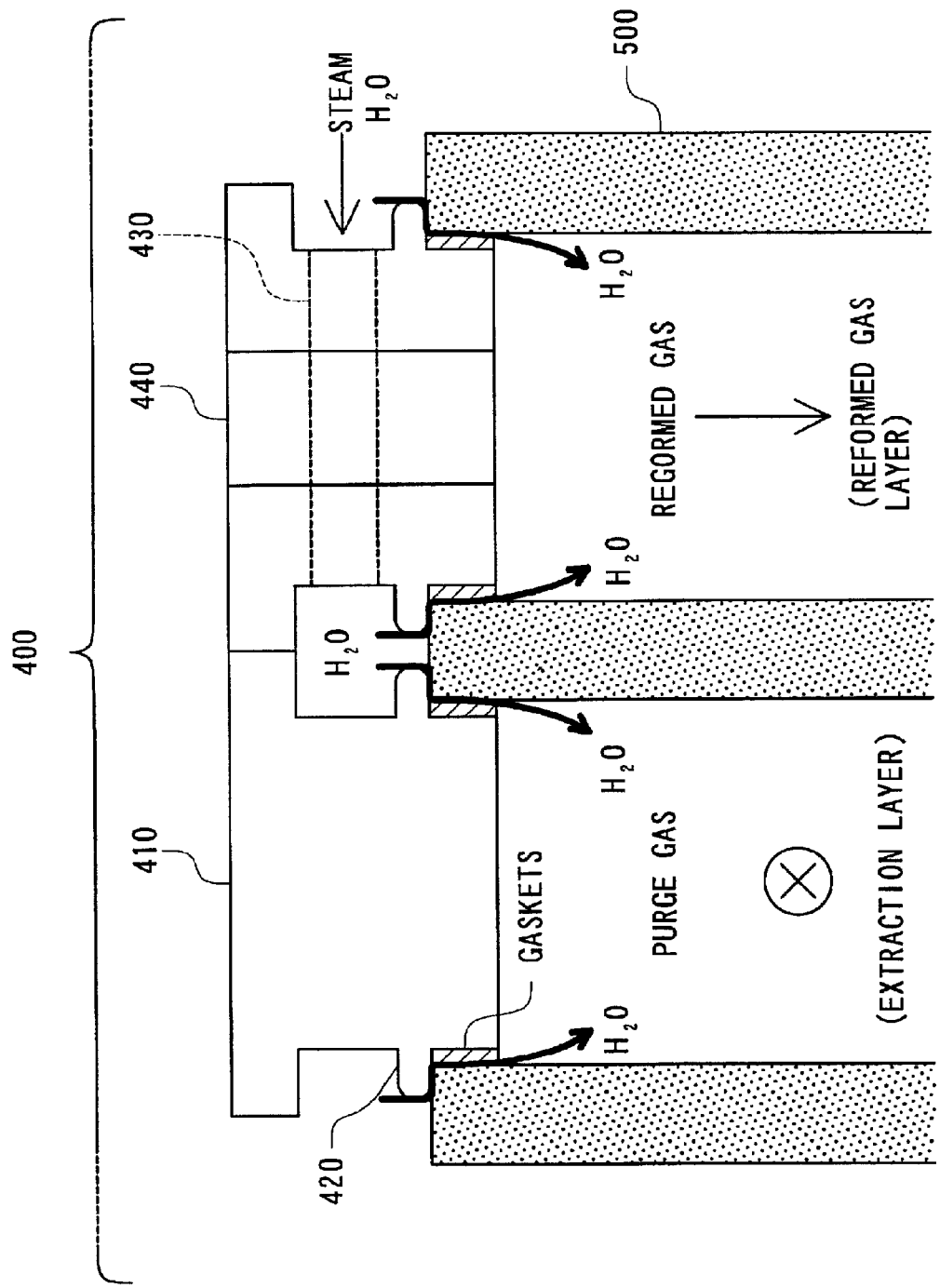
FIG. 24 shows part of the cross section of the hydrogen separation filter 400 with a gas leakage prevention mechanism.

FIG. 24 shows part of the cross section of the hydrogen separation filter 400 with a gas leakage prevention mechanism. Steam having a little higher pressure than those of the reformed gas and the purge gas is flown into the steam supply inlet 430. In this embodiment, there is a pressure difference of about $9.8 \times 10^4$ Pa (1 kgf/cm$^2$). The metal filters 410 adjoining to each other via the gaskets and the separation film 500 are welded to each other. This effectively prevents steam from leaking to the outside of the hydrogen separation filter 400. The space defined by the recesses of the two adjoining metal frames 410 and the separation film 500 are filled with steam. When there is any site of poor gas tightness between the metal frame 410 and the separation film 500, steam is leaked from the site to the reformed gas layer or the extraction layer. This arrangement effectively prevents the reformed gas from being mixed with the purge gas.

The hydrogen separation filter 400 of the fifth embodiment uses the metal frames 410, which are readily processed and integrated with the sealing members and the gas leakage prevention mechanism for preventing gas leakage from the reformed gas layers, the extraction layers, and the side faces of the respective layers. The metal frames 410 are also readily joined with the manifolds and other constituents of fuel cells.

J. Sixth Embodiment

Figure 25:
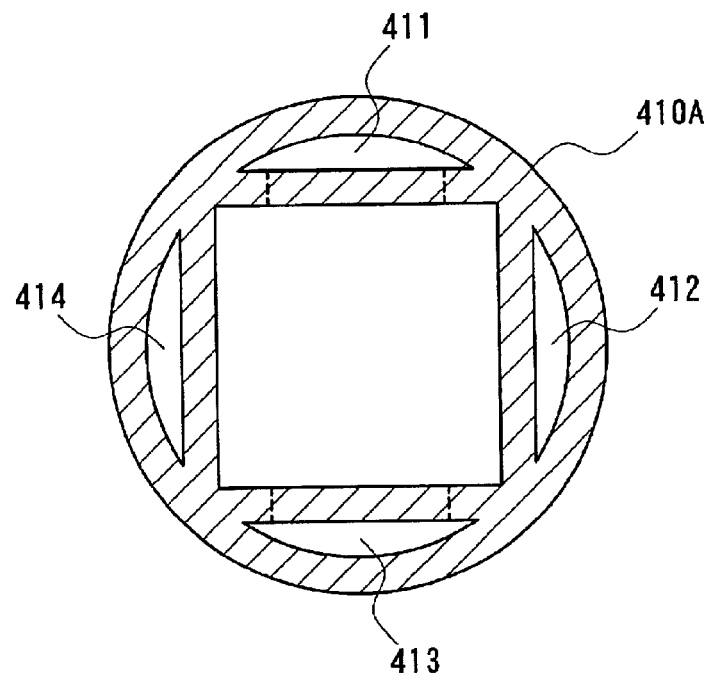
FIG. 25 is a front view schematically illustrating the structure of a metal frame 410A included in a hydrogen separation filter 400A in a sixth embodiment of the present invention.

FIG. 25 is a front view schematically illustrating the structure of a metal frame 410A included in a hydrogen separation filter 400A in a sixth embodiment of the present invention. The metal frame 410A is obtained by joining the four corners of the respective square metal frames 410 of the fifth embodiment with a cylindrical metal frame. The metal frame 410A of this shape is readily formed by welding, although it may be molded integrally.

Four vacant spaces between the square inner frame and the circular outer frame in the metal frame 410A respectively form flow path forming elements 411, 412, 413, and 414. The inner frame has the gas supply inlet 440 and the gas discharge outlet 440 in the planes defining the flow path forming elements 411 and 413. The planes defining the flow path forming elements 411 and 413 do not have such inlet or outlet. In the laminate structure of the metal frames 410A, the four flow path forming elements 411 through 414 respectively define four flow paths that allow the corresponding gases to be flown in the laminating direction. Seen from each metal frame, these four flow paths are completely isolated from one another. The other configuration is similar to that of the metal frames 410 of the fifth embodiment.

Figure 26:
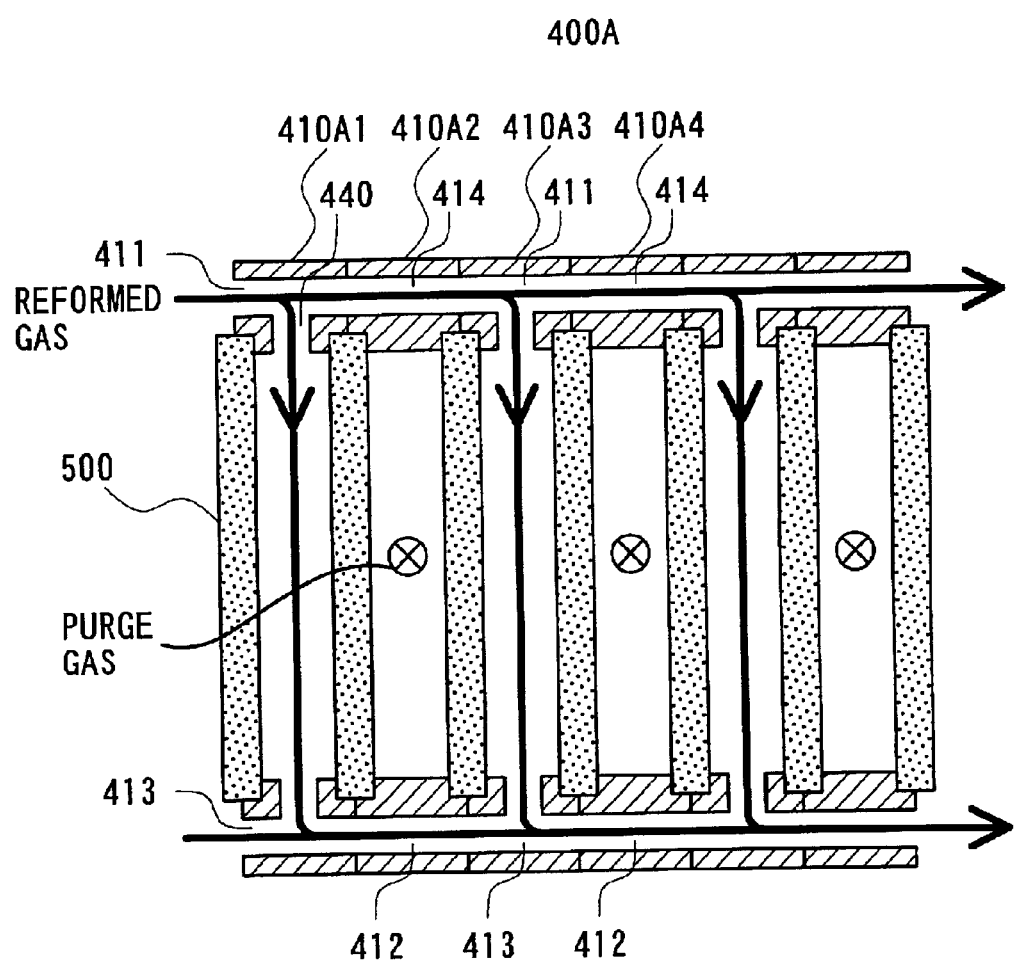
FIG. 26 shows part of the cross section of the hydrogen separation filter 400A with the gas flow.

FIG. 26 shows part of the cross section of the hydrogen separation filter 400A with the gas flow. The laminate structure of the hydrogen separation filter 400A is obtained by alternately rotating the metal frames 410A by 90 degrees. The gas leakage prevention mechanism shown in FIG. 24 is omitted from the illustration of FIG. 26. The reformed gas supplied from the flow path forming element 411 of a metal frame 410A1 flows through the flow path forming element 414 of an adjoining metal frame 410A2, the flow path forming element 411 of still adjoining metal frame 410A3, and the flow path forming element 414 of a next metal frame 410A3 in this sequence in the laminating direction. The reformed gas supplied from the gas supply inlet 440 also flows into the respective reformed gas layers in parallel. Like the reformed gas, the purge gas flows through the flow path forming elements of the respective metal frames in the laminating direction, while flowing into the respective extraction layers in parallel (the direction from the surface to the rear face in FIG. 26). These flow paths function as the manifolds.

Application of the casing with the manifolds shown in FIG. 1 to the hydrogen separation filter 400 including the metal frames 410 of the fifth embodiment gives a hydrogen separation mechanism. It is, however, difficult to seal the hydrogen separation filter 400 from the casing, especially at the corners of the hydrogen separation filter 400. The sixth embodiment is the laminate structure of the metal frames 410A with the four flow path forming elements 411 through 414, which respectively form the isolated flow paths. This arrangement readily manufactures the hydrogen separation mechanism without taking into account the possibility of gas leakage among the four flow paths, while ensuring the sufficient gas tightness at the joint of the adjoining metal frames 410A. The hydrogen separation filter 400A is integrated with the manifolds and accordingly has the smaller size than that of the hydrogen separation mechanism shown in FIG. 1.

K. Modifications of Sixth Embodiment

Figure 27:
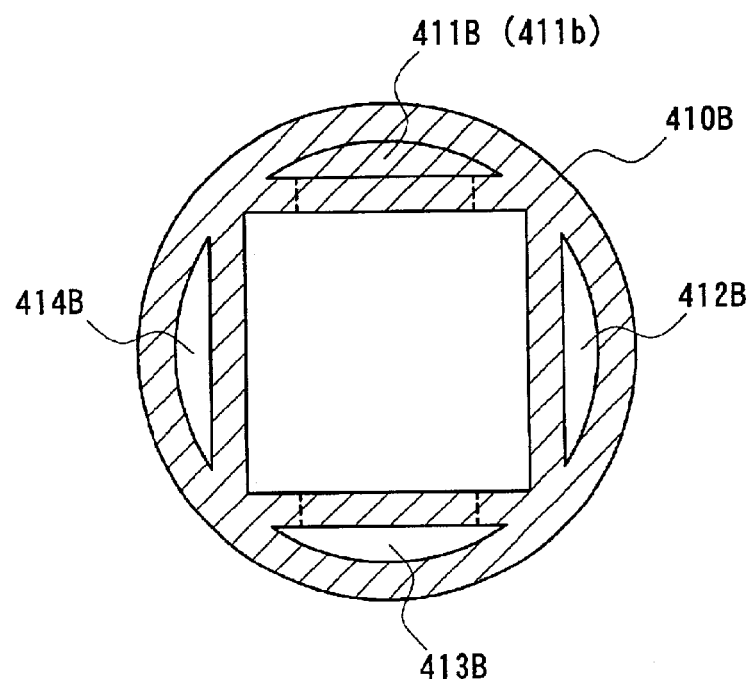
FIG. 27 is a front view schematically illustrating the structure of a metal frame 410B included in a hydrogen separation filter 400B in one modification of the sixth embodiment.
Figure 28:
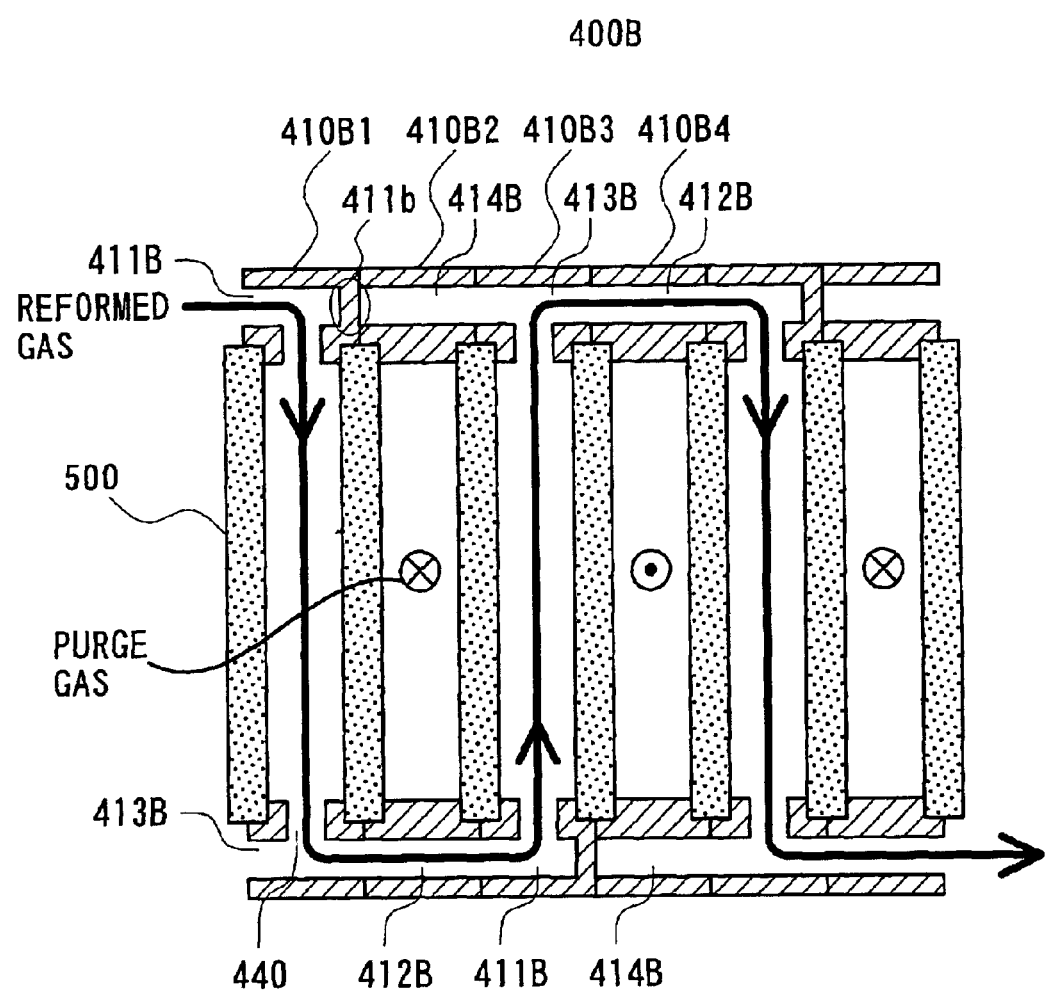
FIG. 28 shows part of the cross section of the hydrogen separation filter 400B with the gas flow.

FIG. 27 is a front view schematically illustrating the structure of a metal frame 410B included in a hydrogen separation filter 400B in one modification of the sixth embodiment. The metal frame 410B is similar to the metal frame 410A, except that a gas flow cutoff element 411*b* is located in the flow path forming element 411 of the metal frame 410A, that is, one face of the metal frame 410A is blocked not to allow continuous connection of flow path forming elements 411B in the laminating direction as shown in FIG. 28. The gas flow cutoff element may be provided in any flow path forming element other than the flow path forming element 411B.

FIG. 28 shows part of the cross section of the hydrogen separation filter 400B with the gas flow. The laminate structure of the hydrogen separation filter 400B is obtained by rotating the metal frames 410B by 90 degrees. The function of the gas flow cutoff element 411*b* causes the reformed gas supplied from the flow path forming element 411B of a metal frame 410B1 to successively flow through the respective reformed gas layers in series as shown by the arrows. Like the reformed gas, the purge gas also successively flows through the respective extraction layers in series (in the direction from the surface to the rear face of a metal frame 410B2 and in the direction from the rear face to the surface of another metal frame 410B4 in FIG. 28).

Another modification of the sixth embodiment is a hydrogen separation filter 400C, which is obtained by alternately laying the metal frames 410A and the metal frames 410B one upon the other. In the hydrogen separation filter 400C, the metal frames 410B are rotated by 180 degrees in the laminate structure to define a plurality of reformed gas layers. The metal frames 410A are laminated to make the purge gas flow in the direction perpendicular to the flow direction of the reformed gas, so as to define a plurality of extraction layers.

Figure 29:
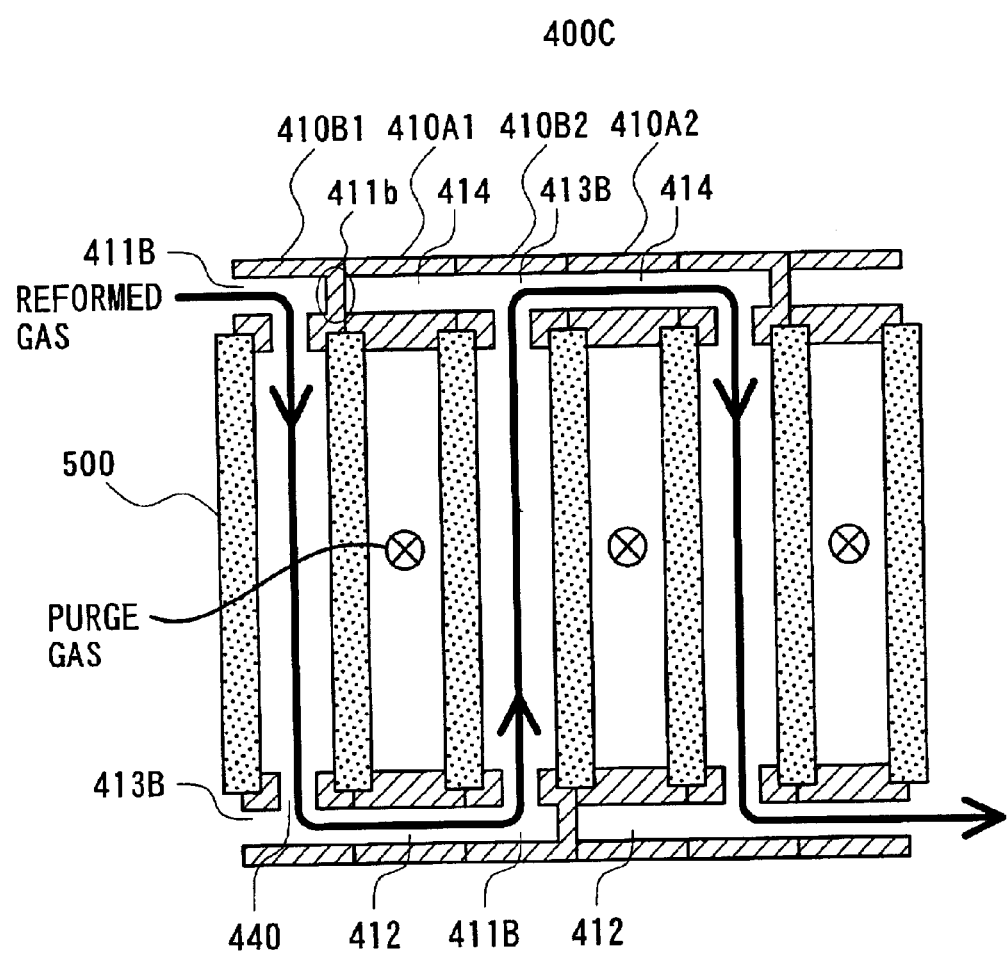
FIG. 29 shows part of the cross section of the hydrogen separation filter 400C with the gas flow.

FIG. 29 shows part of the cross section of the hydrogen separation filter 400C with the gas flow. In the hydrogen separation filter 400C, the reformed gas successively flows through the respective reformed gas layers in series like the hydrogen separation filter 400B, whereas the purge gas flows through the respective extraction layers in parallel like the hydrogen separation filter 400A.

The modified examples of the sixth embodiment use the easily processed metal frames to attain the structure of making the reformed gas flow through the plurality of layers in series shown in FIGS. 17 and 18 and thereby increase the quantity of hydrogen transmission.

Figure 30:
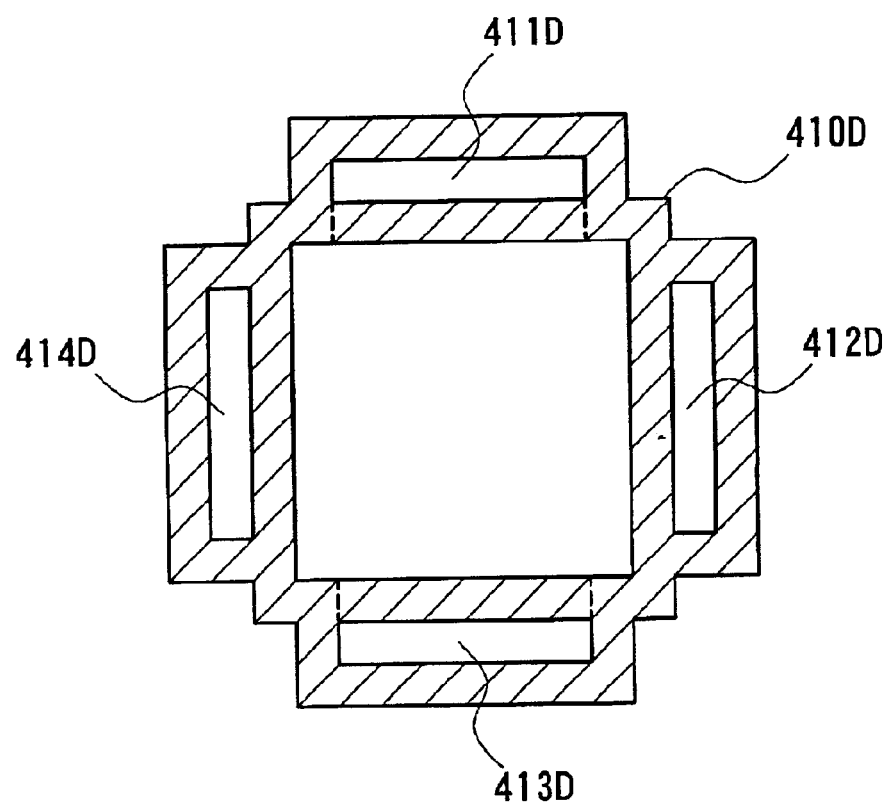
FIG. 30 is a front view schematically illustrating the structure of a metal frame 410D included in a hydrogen separation filter 400D in another modification of the sixth embodiment.
Figure 31A:
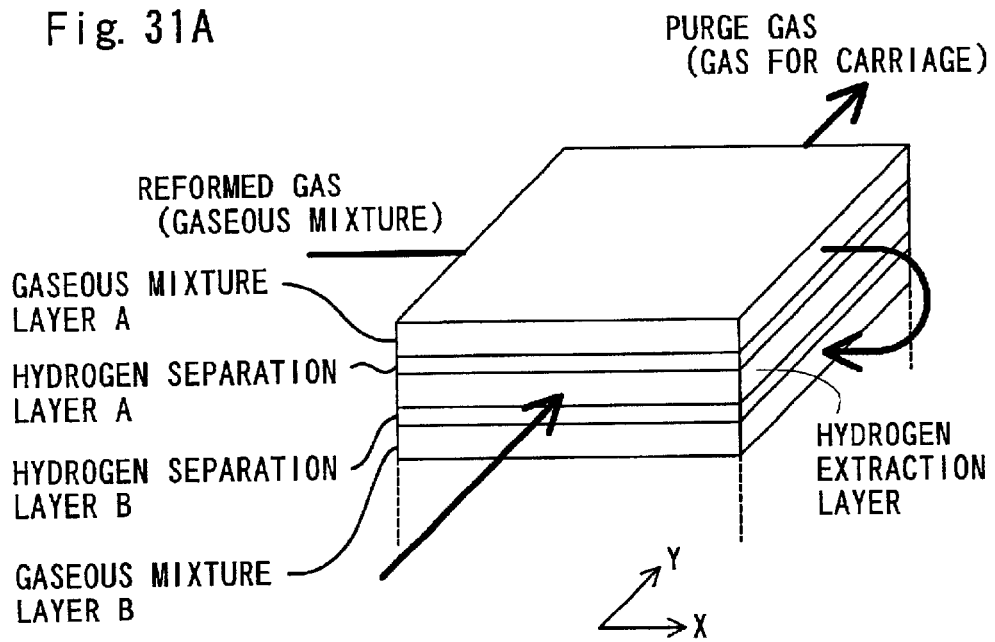
FIG. 31A through 31C show distributions of hydrogen partial pressure difference between the gaseous mixture layer and the hydrogen extraction layer when the reformed gas (gaseous mixture) is flown through the gaseous mixture layers in series.
Figure 31B:
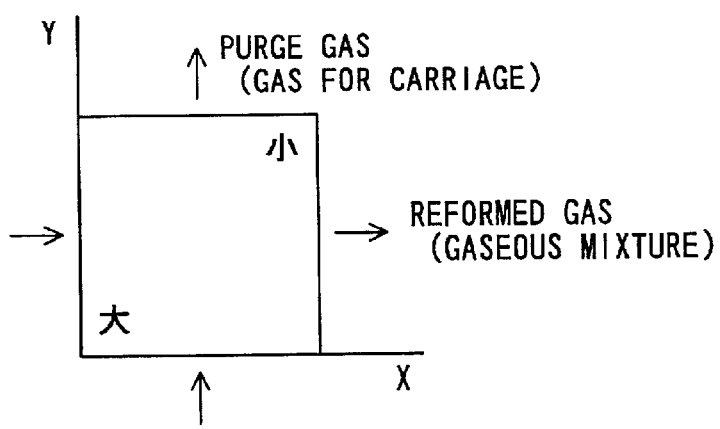
Figure 31C:
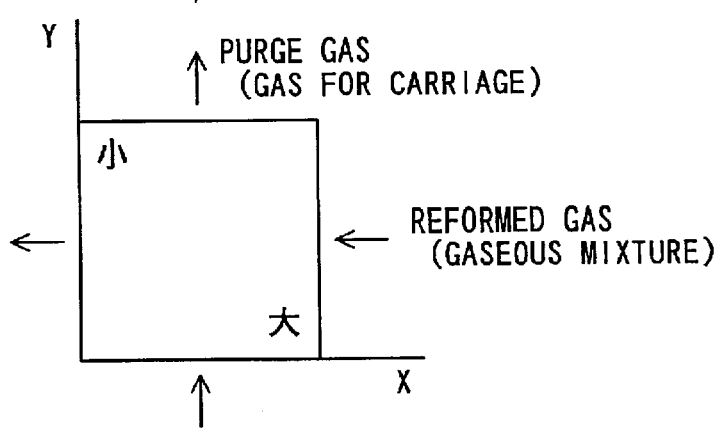

Although the above embodiments and their modifications regard the laminate structure of rectangular layers, the respective layers may have an arbitrary shape. The sixth embodiment and its modified examples use the cylindrical metal frames to define the flow path forming elements. The flow path forming elements may be rectangular in shape. It is preferable that the metal frame has a configuration of 4-fold symmetry. The configuration of 4-fold symmetry represents the shape that becomes coincident at every rotation of 90 degrees about the axis of rotation. This arrangement enables identical parts to be applied for the reformed gas layers and the extraction layers. FIG. 30 is a front view schematically illustrating the structure of a metal frame 410D included in a hydrogen separation filter 400D in another modification of the sixth embodiment. This structure exerts the same effects as those discussed above. The flat circumference of the hydrogen separation filter 400D advantageously facilitates the storage and the installation thereof.

The above embodiments are to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

For example, in the structure of the third embodiment (see FIG. 14), the methanation catalyst may further be carried on the hydrogen extraction layer. The third embodiment and its modified example regard the structure of methanation of carbon monoxide. A catalyst for selectively oxidizing carbon monoxide may be carried on the structure.

The scope and spirit of the present invention are indicated by the appended claims, rather than by the foregoing description.

What is claimed is:

1. A hydrogen generator that generates hydrogen from a predetermined material, said hydrogen generator comprising:

a porous gaseous mixture layer through which a gaseous mixture including hydrogen passes;

a hydrogen separation layer that allows only the hydrogen to selectively permeate therethrough for separation of the hydrogen; and a porous hydrogen extraction layer through which a hydrogen rich gas passes, the hydrogen rich gas mainly containing the hydrogen selectively permeating the hydrogen separation layer, wherein the respective layers form a laminate structure, in which the hydrogen separation layer is interposed between the gaseous mixture layer and the hydrogen extraction layer.

2. A hydrogen generator in accordance with claim 1, wherein a cushioning member is interposed between the hydrogen separation layer and the adjoining porous layer.

3. A hydrogen generator in accordance with claim 1, wherein at least one of the hydrogen separation layer and the porous layer has a preventive mechanism that prevents the whole surface of the hydrogen separation layer from being in direct contact with the adjoining porous layer.

4. A hydrogen generator in accordance with claim 1, wherein the hydrogen separation layer comprises a plurality of small base members with a hydrogen separating metal carried thereon and a support mechanism that supports the plurality of small base members in a two-dimensional arrangement.

5. A hydrogen generator in accordance with claim 4, wherein the support mechanism comprises a frame having recesses that accommodate the plurality of small base members therein.

6. A hydrogen generator in accordance with claim 1, said hydrogen generator further comprising a gas-tight casing member that covers over the whole laminate structure.

7. A hydrogen generator in accordance with claim 6, wherein the casing member comprises manifolds that respectively connect with a gas inlet into and a gas outlet from the gaseous mixture layer and with a gas inlet into and a gas outlet from the hydrogen extraction layer and allow the gas to be flown from outside to the laminate structure and flown out of the laminate structure to the outside.

8. A hydrogen generator in accordance with claim 7, wherein the manifold has a gas flow rate regulation mechanism that is arranged in a neighborhood of each of the gas inlets into the gaseous mixture layer and the hydrogen extraction layer to regulate the gas flow rate of the corresponding intake gas to a fixed value.

9. A hydrogen generator in accordance with claim 7, wherein the casing member comprises a gas leakage prevention mechanism that prevents leakage of any gas and is provided in at least part of a space between the gas inlet into the gaseous mixture layer and the gas inlet into the hydrogen extraction layer, a space between the gas inlet into the gaseous mixture layer and the gas outlet from the hydrogen extraction layer, a space between the gas outlet from the gaseous mixture layer and the gas inlet into the hydrogen extraction layer, and a space between the gas outlet from the gaseous mixture layer and the gas outlet from the hydrogen extraction layer.

10. A hydrogen generator in accordance with claim 9, wherein the gas leakage prevention mechanism comprises a flow path that allows a predetermined gas having a higher pressure than the gas pressures at the gas inlet and the gas outlet to flow toward the gas inlet and the gas outlet.

11. A hydrogen generator in accordance with claim 10, wherein the predetermined gas is steam.

12. A hydrogen generator in accordance with claim 2, wherein a cushioning member is interposed between the casing member and the laminate structure.

13. A hydrogen generator in accordance with claim 1, wherein the porous layer comprises a regulation structure that is a denser portion formed on part of a side face of the porous layer and regulates a flow direction of the gas in the porous layer.

14. A hydrogen generator in accordance claim 1, said hydrogen generator further comprises sealing members to mutually seal the gas inlet into the gaseous mixture layer, the gas outlet from the gaseous mixture layer, the gas inlet into the hydrogen extraction layer, and the gas outlet from the hydrogen extraction layer against one another.

15. A hydrogen generator in accordance with claim 1, wherein the respective layers form the laminate structure in such a manner that the hydrogen extraction layers are located on both ends of the laminate structure.

16. A hydrogen generator in accordance with claim 1, wherein the gaseous mixture layer comprises a catalyst carried thereon to accelerate a predetermined chemical reaction according to the intake gas.

17. A hydrogen generator in accordance with claim 1, wherein the hydrogen separation layer comprises a porous support body having pores filled with a hydrogen separating metal.

18. A hydrogen generator in accordance with claim 1, said hydrogen generator further comprising a carbon monoxide concentration reduction layer that is located in a flow path of the hydrogen rich gas, which mainly contains the separated hydrogen, and has a specific catalyst carried thereon for accelerating a chemical reaction to lower concentration of carbon monoxide included in the hydrogen rich gas.

19. A hydrogen generator in accordance with claim 18, wherein the specific catalyst is a methanation catalyst of carbon monoxide.

20. A hydrogen generator in accordance with claim 19, wherein the specific catalyst contains one metal selected among the group consisting of nickel, ruthenium, and rhodium.

21. A hydrogen generator in accordance with claim 18, wherein the hydrogen separation layer comprises a hydrogen separation film integrally formed with a porous support body, and the carbon monoxide concentration reduction layer is obtained by making the specific catalyst carried in one site of the porous support body where the hydrogen separation film is not formed.

22. A hydrogen generator in accordance with claim 18, wherein the carbon monoxide concentration reduction layer is integrally formed with the hydrogen extraction layer by making the specific catalyst carried in the hydrogen extraction layer.

23. A hydrogen generator that generates hydrogen from a predetermined material, said hydrogen generator comprising:

a porous gaseous mixture layer through which a gaseous mixture including hydrogen passes;

a hydrogen separation layer that allows only the hydrogen to selectively permeate therethrough for separation of the hydrogen; and a hydrogen extraction layer through which a hydrogen rich gas passes, the hydrogen rich gas mainly containing the hydrogen selectively permeating the hydrogen separation layer, wherein the respective layers form a laminate structure, in which a gas inlet into the gaseous mixture layer, a gas outlet from the gaseous mixture layer, a gas inlet into the hydrogen extraction layer, and a gas outlet from the hydrogen extraction layer are arranged in predetermined directions in preset side faces of the laminate structure, and the hydrogen separation layer is interposed between the gaseous mixture layer and the hydrogen extraction layer.

24. A hydrogen generator in accordance with claim 23, wherein the laminate structure includes a plurality of the gaseous mixture layers and a plurality of the hydrogen extraction layers, and at least either of the plurality of gaseous mixture layers and the plurality of hydrogen extraction layers are connected to allow the corresponding gas to successively flow through at least part of the plurality of layers in series.

25. A hydrogen generator in accordance with claim 23, wherein at least either of the gaseous mixture layer and the hydrogen extraction layer in the laminate structure is designed to allow the corresponding gas to flow in a serpentine manner.

26. A hydrogen generator in accordance with claim 25, wherein the gas inlet into and the gas outlet from either of the gaseous mixture layer and the hydrogen extraction layer are located in one identical direction of the laminate structure.

27. A hydrogen generator in accordance with claim 23, wherein the hydrogen separation layer comprises a plurality of small base members with a hydrogen separating metal carried thereon and a support mechanism that supports the plurality of small base members in a two-dimensional arrangement.

28. A hydrogen generator in accordance with claim 27, wherein the support mechanism comprises a frame having recesses that accommodate the plurality of small base members therein.

29. A hydrogen generator in accordance with claim 23, said hydrogen generator further comprising a gas-tight casing member that covers over the whole laminate structure.

30. A hydrogen generator in accordance with claim 29, wherein the casing member comprises manifolds that respectively connect with a gas inlet into and a gas outlet from the gaseous mixture layer and with a gas inlet into and a gas outlet from the hydrogen extraction layer and allow the gas to be flown from outside to the laminate structure and flown out of the laminate structure to the outside.

31. A hydrogen generator in accordance with claim 30, wherein the manifold has a gas flow rate regulation mechanism that is arranged in a neighborhood of each of the gas inlets into the gaseous mixture layer and the hydrogen extraction layer to regulate the gas flow rate of the corresponding intake gas to a fixed value.

32. A hydrogen generator in accordance with claim 30, wherein the casing member comprises a gas leakage prevention mechanism that prevents leakage of any gas and is provided in at least part of a space between the gas inlet into the gaseous mixture layer and the gas inlet into the hydrogen extraction layer, a space between the gas inlet into the gaseous mixture layer and the gas outlet from the hydrogen extraction layer, a space between the gas outlet from the gaseous mixture layer and the gas inlet into the hydrogen extraction layer, and a space between the gas outlet from the gaseous mixture layer and the gas outlet from the hydrogen extraction layer.

33. A hydrogen generator in accordance with claim 32, wherein the gas leakage prevention mechanism comprises a flow path that allows a predetermined gas having a higher pressure than the gas pressures at the gas inlet and the gas outlet to flow toward the gas inlet and the gas outlet.

34. A hydrogen generator in accordance with claim 33, wherein the predetermined gas is steam.

35. A hydrogen generator in accordance with claim 29, wherein a cushioning member is interposed between the casing member and the laminate structure.

36. A hydrogen generator in accordance with claim 23, wherein the porous layer comprises a regulation structure that is a denser portion formed on part of a side face of the porous layer and regulates a flow direction of the gas in the porous layer.

37. A hydrogen generator in accordance with claim 23, said hydrogen generator further comprises sealing members to mutually seal the gas inlet into the gaseous mixture layer, the gas outlet from the gaseous mixture layer, the gas inlet into the hydrogen extraction layer, and the gas outlet from the hydrogen extraction layer against one another.

38. A hydrogen generator in accordance with claims 23, wherein the respective layers form the laminate structure in such a manner that the hydrogen extraction layers are located on both ends of the laminate structure.

39. A hydrogen generator in accordance with claim 23, wherein the gaseous mixture layer comprises a catalyst carried thereon to accelerate a predetermined chemical reaction according to the intake gas.

40. A hydrogen generator in accordance with claim 23, wherein the hydrogen separation layer comprises a porous support body having pores filled with a hydrogen separating metal.

41. A hydrogen generator in accordance with claim 23, said hydrogen generator further comprising a carbon monoxide concentration reduction layer that is located in a flow path of the hydrogen rich gas, which mainly contains the separated hydrogen, and has a specific catalyst carried thereon for accelerating a chemical reaction to lower concentration of carbon monoxide included in the hydrogen rich gas.

42. A hydrogen generator in accordance with claim 41, wherein the specific catalyst is a methanation catalyst of carbon monoxide.

43. A hydrogen generator in accordance with claim 42, wherein the specific catalyst contains one metal selected among the group consisting of nickel, ruthenium, and rhodium.

44. A hydrogen generator in accordance with claim 41, wherein the hydrogen separation layer comprises a hydrogen separation film integrally formed with a porous support body, and
the carbon monoxide concentration reduction layer is obtained by making the specific catalyst carried in one site of the porous support body where the hydrogen separation film is not formed.

45. A hydrogen generator in accordance with claim 41, wherein the carbon monoxide concentration reduction layer is integrally formed with the hydrogen extraction layer by making the specific catalyst carried in the hydrogen extraction layer.

46. A hydrogen generator that generates hydrogen from a predetermined material, said hydrogen generator comprising:
a gaseous mixture layer through which a gaseous mixture including hydrogen passes;
a hydrogen separation layer that allows only the hydrogen to selectively permeate therethrough for separation of the hydrogen; and
a hydrogen extraction layer through which a hydrogen rich gas passes, the hydrogen rich gas mainly containing the hydrogen selectively permeating the hydrogen separation layer,
wherein each of the gaseous mixture layer and the hydrogen extraction layer comprises a metal frame having a gas inlet and a gas outlet on side faces thereof, and the respective layers form a laminate structure by joining the metal frames with each other in such a manner that the hydrogen separation layer is interposed between the gaseous mixture layer and the hydrogen extraction layer.

47. A hydrogen generator in accordance with claim 46, wherein the metal frames respectively comprise flow path defining members that are connected to each other to form a gas flow path, which allows a gas to be flown in a laminating direction and to be flown into the gas inlet and flown out of the gas outlet when the metal frames are joined with each other in the laminate structure.

48. A hydrogen generator in accordance with claim 47, wherein the laminate structure comprises a plurality of the gaseous mixture layers and a plurality of the hydrogen extraction layers, and the gas flow path is arranged to allow a predetermined gas to flow in parallel through at least either of the plurality of gaseous mixture layers and the plurality of hydrogen extraction layers.

49. A hydrogen generator in accordance with claim 47, wherein the laminate structure comprises a plurality of the gaseous mixture layers and a plurality of the hydrogen extraction layers, and the flow path defining member comprises a gas flow cutoff element that is formed in at least part of the flow path defining member to cut off the gas flow in the laminating direction, the gas flow cutoff element functioning to allow a predetermined gas to flow in series through at least either of the plurality of gaseous mixture layers and the plurality of hydrogen extraction layers.

50. A hydrogen generator in accordance with claim 46, wherein the metal frame has a configuration of 4-fold symmetry about an axis in the laminating direction, and the gas inlet and the gas outlet are located at opposite positions in a plane perpendicular to the laminating direction.

51. A hydrogen generator in accordance with claim 46, wherein the laminate structure comprises a flow path that allows a flow of a predetermined gas having a higher pressure than the gas pressures in the gaseous mixture layer and the hydrogen extraction layer as a gas leakage prevention mechanism that prevents leakage of the gas between the gaseous mixture layer and the hydrogen extraction layer.

52. A hydrogen generator in accordance with claim 51, wherein the predetermined gas is steam.

* * * * *